(12) United States Patent
Chaves et al.

(10) Patent No.: US 11,820,387 B2
(45) Date of Patent: Nov. 21, 2023

(54) DETECTING DRIVING BEHAVIOR OF VEHICLES

(71) Applicant: QUALCOMM Incorporated, San Diego, CA (US)

(72) Inventors: Stephen Marc Chaves, Philadelphia, PA (US); Damir Didjusto, San Diego, CA (US); Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/315,609

(22) Filed: May 10, 2021

(65) Prior Publication Data

US 2022/0355802 A1 Nov. 10, 2022

(51) Int. Cl.
*B60W 40/09* (2012.01)
*H04W 4/44* (2018.01)
*G06V 20/58* (2022.01)
*B60W 40/105* (2012.01)

(52) U.S. Cl.
CPC .......... *B60W 40/09* (2013.01); *B60W 40/105* (2013.01); *G06V 20/584* (2022.01); *H04W 4/44* (2018.02); *B60W 2554/4045* (2020.02); *B60W 2554/4046* (2020.02); *B60W 2554/4049* (2020.02); *B60W 2554/80* (2020.02)

(58) Field of Classification Search
CPC ............. B60W 40/09; B60W 2554/80; B60W 2554/4045; B60W 2554/4046; B60W 2554/4049; H04W 4/44; H04W 4/105; G06V 20/584

USPC ............................................................. 701/1
See application file for complete search history.

(56) References Cited

U.S. PATENT DOCUMENTS

| | | | |
|---|---|---|---|
| 9,104,535 B1 * | 8/2015 | Brinkmann | G07C 5/085 |
| 9,646,428 B1 * | 5/2017 | Konrardy | G08G 1/164 |
| 10,037,699 B1 * | 7/2018 | Toyoda | B62D 15/029 |
| 10,079,929 B2 | 9/2018 | Lord et al. | |
| 10,122,736 B2 | 11/2018 | Baxley et al. | |
| 10,300,922 B2 * | 5/2019 | Volos | G07C 5/008 |
| 10,475,127 B1 * | 11/2019 | Potter | B60W 40/08 |

(Continued)

OTHER PUBLICATIONS

International Search Report and Written Opinion—PCT/US2022/020798—ISA/EPO—dated Jun. 20, 2022.

*Primary Examiner* — Richard A Goldman
(74) *Attorney, Agent, or Firm* — QUALCOMM Incorporated

(57) ABSTRACT

Systems and methods for determining whether a vehicle is driving in an unsafe or unsatisfactory manner are disclosed. In some implementations, a system may determine one or more driving scores for a vehicle based on observations of a driving behavior of the vehicle during a time period. The system may generate an indication of unsatisfactory driving based on at least one of the one or more driving scores exceeding a threshold value. The system may provide the indication of unsatisfactory driving to one or more entities. In some aspects, the system may identify one or more dangerous driving attributes exhibited by the vehicle during the time period based on the observations received from the one or more devices. The system may also generate the indication of unsatisfactory driving based at least in part on the identified dangerous driving attributes.

28 Claims, 10 Drawing Sheets

800

802
Identify one or more dangerous driving attributes exhibited by the vehicle during the time period based on the observations received from the one or more devices.

804
Generate the indication of unsatisfactory driving based at least in part on the identified dangerous driving attributes.

(56) References Cited

U.S. PATENT DOCUMENTS

| | | | |
|---|---|---|---|
| 10,703,378 B1 | 7/2020 | Russo et al. | |
| 10,720,080 B1* | 7/2020 | Fields | G09B 19/14 |
| 10,878,062 B1* | 12/2020 | Garavaglia | G16H 40/20 |
| 10,946,862 B1* | 3/2021 | Bischoff | G06Q 40/08 |
| 11,007,979 B1* | 5/2021 | Mitchell | B60R 25/33 |
| 2005/0131597 A1* | 6/2005 | Raz | G09B 19/167 |
| | | | 701/29.1 |
| 2007/0299610 A1* | 12/2007 | Ewerhart | B60T 7/22 |
| | | | 701/301 |
| 2009/0040054 A1* | 2/2009 | Wang | G06V 20/597 |
| | | | 340/576 |
| 2012/0245758 A1* | 9/2012 | Mizuta | B60W 30/182 |
| | | | 701/1 |
| 2014/0113619 A1* | 4/2014 | Tibbitts | B60T 8/172 |
| | | | 455/419 |
| 2014/0114502 A1* | 4/2014 | Hugron | G07C 5/008 |
| | | | 701/1 |
| 2014/0128146 A1* | 5/2014 | Story, Jr. | A63F 13/217 |
| | | | 463/36 |
| 2014/0257874 A1* | 9/2014 | Hayward | G07C 5/00 |
| | | | 705/4 |
| 2016/0101785 A1* | 4/2016 | Takahashi | B60W 50/14 |
| | | | 701/31.4 |
| 2017/0021833 A1* | 1/2017 | Abdel-Rahman | B60W 30/16 |
| 2017/0041737 A1* | 2/2017 | Fischer | H04W 4/027 |
| 2017/0132521 A1* | 5/2017 | Xu | B60W 40/08 |
| 2017/0191847 A1* | 7/2017 | Chintakindi | G01C 21/3484 |
| 2017/0301220 A1 | 10/2017 | Jarrell et al. | |
| 2017/0322047 A1* | 11/2017 | Verheijen | F16H 61/0246 |
| 2018/0096629 A1* | 4/2018 | Paul | G09B 19/14 |
| 2018/0345981 A1* | 12/2018 | Ferguson | G07C 5/008 |
| 2018/0362031 A1* | 12/2018 | Chang | B60W 30/0956 |
| 2019/0005412 A1* | 1/2019 | Matus | G06Q 30/0201 |
| 2019/0050904 A1* | 2/2019 | Wasserman | G08G 1/0116 |
| 2019/0102840 A1* | 4/2019 | Perl | G06Q 40/08 |
| 2019/0172345 A1 | 6/2019 | Lin et al. | |
| 2019/0286133 A1 | 9/2019 | Bielby | |
| 2019/0294881 A1* | 9/2019 | Polak | G06N 3/04 |
| 2019/0311404 A1* | 10/2019 | Wasserman | G06Q 30/0265 |
| 2019/0384292 A1* | 12/2019 | Aragon | B60W 40/09 |
| 2020/0055525 A1* | 2/2020 | Zeng | B60W 40/09 |
| 2020/0064444 A1* | 2/2020 | Regani | G01S 7/417 |
| 2020/0073384 A1* | 3/2020 | Deng | G05D 1/0276 |
| 2020/0310450 A1* | 10/2020 | Reschka | B60W 60/0011 |
| 2021/0043077 A1* | 2/2021 | Kobayashi | B60W 40/09 |
| 2021/0094553 A1* | 4/2021 | Lee | H04L 12/40176 |
| 2021/0097314 A1* | 4/2021 | Scanlon | G06V 20/582 |
| 2021/0110480 A1* | 4/2021 | Kwak | G07C 5/008 |
| 2021/0125076 A1* | 4/2021 | Zhang | G08G 1/0137 |
| 2021/0181753 A1* | 6/2021 | Likhterman | B60W 60/0015 |
| 2021/0253113 A1* | 8/2021 | Haran | G08G 1/09675 |
| 2022/0005086 A1* | 1/2022 | Ittiachen | G06Q 10/06398 |
| 2022/0266691 A1* | 8/2022 | Laitsaari | A61B 5/18 |
| 2022/0270177 A1* | 8/2022 | Chintakindi | H04W 4/38 |
| 2023/0052039 A1* | 2/2023 | McCawley | B60W 60/0027 |

* cited by examiner

DETECTING DRIVING BEHAVIOR OF VEHICLES

TECHNICAL FIELD

This disclosure relates generally to vehicles and, more specifically, to systems and methods for determining whether a vehicle is driving in an unsafe or unsatisfactory manner.

DESCRIPTION OF THE RELATED TECHNOLOGY

Autonomous vehicles can operate in an autonomous mode or semi-autonomous mode during which the autonomous vehicle navigates through an environment with little or no input from a driver. These autonomous vehicles typically include various sensors that can determine information about the environment in which the autonomous vehicle operates. For example, autonomous vehicles typically include light detection and ranging (LIDAR) devices, video cameras, and other sensing devices to detect objects (e.g., other vehicles, pedestrians, traffic signals, obstacles, and so on) in the environment and to determine a variety of attributes and features of the detected objects (e.g., size, shape, contours, orientation, and so on). These sensing devices can also determine distances between the detected objects and the autonomous vehicle, determine movements and velocities of the detected objects, and determine trajectories of the detected objects.

Although objection detection and decision-making capabilities of autonomous vehicles continually improves, autonomous vehicles are still prone to accidents, erratic maneuvers, and dangerous driving. Further, while the number of companies operating in the autonomous vehicle industry continues to increase, there is no governing body or standards association to ensure compatibility between the different navigation platforms, risk assessment protocols, and collision avoidance systems provided by these various companies. These differences may exacerbate erratic, unpredictable, and potentially dangerous driving by autonomous vehicles. Moreover, vehicles driven by humans are also prone to accidents, erratic maneuvers, and dangerous driving.

SUMMARY

The systems, methods, and devices of this disclosure may be used to observe a driving behavior of a vehicle and determine whether the driving behavior is unsatisfactory. When the driving behavior is determined to be unsatisfactory, an indication of the unsatisfactory driving behavior may be sent to one or more entities.

In some implementations, the system may include one or more transceivers and one or more processors. The one or more transceivers may be configured to exchange signals with one or more other systems or devices. The one or more processors may be coupled to the one or more transceivers, and may be operably configured to determine one or more driving scores for a vehicle based on observations of a driving behavior of the vehicle during a time period. The one or more processors may be further operably configured to generate an indication of unsatisfactory driving based on at least one of the one or more driving scores exceeding a threshold value. The one or more processors may be further operably configured to provide the indication of unsatisfactory driving to one or more entities. In some instances, the indication of unsatisfactory driving may be generated only if the one or more driving scores exceed the threshold value for more than a portion or percentage of the time period.

The vehicle may be any suitable vehicle such as (but not limited to) an autonomous vehicle, a semi-autonomous vehicle, an autonomous vehicle configured for passenger service, or a vehicle operated by a human driver and equipped with an advanced driver assistance system (ADAS). In some implementations, the one or more entities may include (but are not limited to) a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the one or more transceivers may receive the observations from one or more devices via a physical downlink shared channel (PDSCH) of a Fifth Generation New Radio (5G NR) system, a vehicle-to-everything (V2X) channel of the 5G NR system, a vehicle-to-infrastructure (V2I) channel of the 5G NR system, a Fourth Generation Radio Access Network (4G RAN), an unlicensed frequency band, a peer-to-peer (P2P) communication link, a dedicated short range communication (DSRC) channel, a wireless local area network (WLAN), or any combination thereof. In some implementations, the one or more devices may include (but are not limited to) road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

In some implementations, the one or more processors may be further operably configured to identify each occurrence of the vehicle ignoring traffic signs or violating traffic laws during the time period based on the observations received from the one or more devices. The system may generate the indication of unsatisfactory driving based at least in part on the number of identified occurrences during the time period exceeding a threshold number.

In some other implementations, the one or more processors may be further operably configured to identify one or more dangerous driving attributes exhibited by the vehicle during the time period based on the observations received from the one or more devices. The system may generate the indication of unsatisfactory driving based at least in part on the identified dangerous driving attributes. In some instances, the indication of unsatisfactory driving may be generated only if the one or more dangerous driving attributes identified during the time period exceeds a threshold number by more than an amount or percentage. The one or more dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

In some instances, the one or more processors may be further operably configured to determine whether any of the identified dangerous driving attributes are no longer observed in the driving behavior of the vehicle. The system may adjust the one or more driving scores based on the determination. In some other instances, the one or more processors may be further operably configured to generate a report indicating the number of dangerous driving attributes identified during the time period. The system may provide the report to the one or more entities.

In various implementations, the one or more processors may be further operably configured to receive a first indication of a first speed of the vehicle during a first portion of the time period from one or more first devices. The system may receive a second indication of a second speed of the vehicle during a second portion of the time period from one or more second devices. The system may determine whether the vehicle exceeded a speed limit by more than an amount or exceeded the speed limit for more than a duration of time based on the first and second indications. In some implementations, the generation of the indication of unsatisfactory driving may be based at least in part on a determination that the vehicle exceeded the speed limit by more than the amount or exceeded the speed limit for more than the duration of time.

In some implementations, the one or more processors may be further operably configured to determine a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations. The system may provide the determined likelihood to the one or more entities.

In one implementation, the one or more processors may be further operably configured to limit one or more operations of the vehicle in response to determining that the at least one driving score exceeds the threshold value. In some instances, the one or more operations may include limiting a speed of the vehicle or limiting the vehicle to a speed within a certain amount or percentage over a posted speed limit, disabling or limiting one or more features of an infotainment system of the vehicle, disabling or restricting one or more features of a manual driving mode of the vehicle, disabling or restricting one or more features of an autonomous driving mode of the vehicle, restricting travel of the vehicle to certain areas or along certain routes, requiring the vehicle to increase spacings between the vehicle and other vehicles, disabling the vehicle for period of time after the vehicle arrives at a destination, or any combination thereof. In another implementation, the one or more processors may be further operably configured to instruct other vehicles to stay away from the vehicle or increase distances between the vehicle and the other vehicles. In another implementation, the one or more processors may be further operably configured to instruct one or more road-side cameras or road-side sensors to focus on the vehicle.

In various implementations, a method of determining one or more driving characteristics of a vehicle is disclosed. In some implementations, the method may be performed by a system, and may include determining one or more driving scores for a vehicle based on observations of a driving behavior of the vehicle during a time period. The method may include generating an indication of unsatisfactory driving based on at least one of the one or more driving scores exceeding a threshold value. The method may include providing the indication of unsatisfactory driving to one or more entities. In some instances, the indication of unsatisfactory driving may be generated only if the one or more driving scores exceed the threshold value for more than a portion or percentage of the time period.

The vehicle may be any suitable vehicle such as (but not limited to) an autonomous vehicle, a semi-autonomous vehicle, an autonomous vehicle configured for passenger service, or a vehicle operated by a human driver and equipped with ADAS. In some implementations, the one or more entities may include (but are not limited to) a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the observations may be received from one or more devices via a PDSCH of a 5G NR system, a V2X channel of the 5G NR system, a V2I channel of the 5G NR system, a 4G RAN, a P2P communication link, a DSRC channel, a WLAN, or any combination thereof. In some implementations, the one or more devices may include (but are not limited to) road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

In some implementations, the method may include identifying each occurrence of the vehicle ignoring traffic signs or violating traffic laws during the time period based on the observations received from the one or more devices. The method may also include generating the indication of unsatisfactory driving based at least in part on the number of identified occurrences during the time period exceeding a threshold number.

In some other implementations, the method may include identifying one or more dangerous driving attributes exhibited by the vehicle during the time period based on the observations received from the one or more devices. The method may also include generating the indication of unsatisfactory driving based at least in part on the identified dangerous driving attributes. In some instances, the indication of unsatisfactory driving may be generated only if the one or more dangerous driving attributes identified during the time period exceeds a threshold number by more than an amount or percentage. The one or more dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

In some instances, the method may include determining whether any of the identified dangerous driving attributes are no longer observed in the driving behavior of the vehicle. The method may also include adjusting the one or more driving scores based on the determination. In some other instances, the method may include generating a report indicating the number of dangerous driving attributes identified during the time period. The method may also include providing the report to the one or more entities.

In various implementations, the method may include receiving a first indication of a first speed of the vehicle during a first portion of the time period from one or more first devices. The method may also include receiving a second indication of a second speed of the vehicle during a second portion of the time period from one or more second devices. The method may also include determining whether the vehicle exceeded a speed limit by more than an amount or exceeded the speed limit for more than a duration of time based on the first and second indications. In some implementations, the generation of the indication of unsatisfactory driving may be based at least in part on a determination that the vehicle exceeded the speed limit by more than the amount or exceeded the speed limit for more than the duration of time.

In some implementations, the method may include determining a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations. The method may also include providing the determined likelihood to the one or more entities.

In one implementation, the method may also include limiting one or more operations of the vehicle in response to determining that the at least one driving score exceeds the threshold value. In some instances, the one or more operations may include limiting a speed of the vehicle or limiting the vehicle to a speed within a certain amount or percentage over a posted speed limit, disabling or limiting one or more features of an infotainment system of the vehicle, disabling or restricting one or more features of a manual driving mode of the vehicle, disabling or restricting one or more features of an autonomous driving mode of the vehicle, restricting travel of the vehicle to certain areas or along certain routes, requiring the vehicle to increase spacings between the vehicle and other vehicles, disabling the vehicle for period of time after the vehicle arrives at a destination, or any combination thereof. In another implementation, the method may also include instructing other vehicles to stay away from the vehicle or increase distances between the vehicle and the other vehicles. In another implementation, the method may also include instructing one or more road-side cameras or road-side sensors to focus on the vehicle.

In various implementations, a system is disclosed. In some implementations, the system may include means for determining one or more driving scores for a vehicle based on observations of a driving behavior of the vehicle during a time period. The system may include means for generating an indication of unsatisfactory driving based on at least one of the one or more driving scores exceeding a threshold value. The system may include means for providing the indication of unsatisfactory driving to one or more entities. In some instances, the indication of unsatisfactory driving may be generated only if the one or more driving scores exceed the threshold value for more than a portion or percentage of the time period.

The vehicle may be any suitable vehicle such as (but not limited to) an autonomous vehicle, a semi-autonomous vehicle, an autonomous vehicle configured for passenger service, or a vehicle operated by a human driver and equipped with ADAS. In some implementations, the one or more entities may include (but are not limited to) a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the observations may be received from one or more devices via a PDSCH of a 5G NR system, a V2X channel of the 5G NR system, a V2I channel of the 5G NR system, a 4G RAN, a P2P communication link, a DSRC channel, a WLAN, or any combination thereof. In some implementations, the one or more devices may include (but are not limited to) road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

In some implementations, the system may include means for identifying each occurrence of the vehicle ignoring traffic signs or violating traffic laws during the time period based on the observations received from the one or more devices. The system may also include means for generating the indication of unsatisfactory driving based at least in part on the number of identified occurrences during the time period exceeding a threshold number.

In some other implementations, the system may include means for identifying one or more dangerous driving attributes exhibited by the vehicle during the time period based on the observations received from the one or more devices. The system may also include means for generating the indication of unsatisfactory driving based at least in part on the identified dangerous driving attributes. In some instances, the indication of unsatisfactory driving may be generated only if the one or more dangerous driving attributes identified during the time period exceeds a threshold number by more than an amount or percentage. The one or more dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

In some instances, the system may include means for determining whether any of the identified dangerous driving attributes are no longer observed in the driving behavior of the vehicle. The system may also include means for adjusting the one or more driving scores based on the determination. In some other instances, the system may include means for generating a report indicating the number of dangerous driving attributes identified during the time period. The system may also include means for providing the report to the one or more entities.

In various implementations, the system may include means for receiving a first indication of a first speed of the vehicle during a first portion of the time period from one or more first devices. The system may also include means for receiving a second indication of a second speed of the vehicle during a second portion of the time period from one or more second devices. The system may also include means for determining whether the vehicle exceeded a speed limit by more than an amount or exceeded the speed limit for more than a duration of time based on the first and second indications. In some implementations, the generation of the indication of unsatisfactory driving may be based at least in part on a determination that the vehicle exceeded the speed limit by more than the amount or exceeded the speed limit for more than the duration of time.

In some implementations, the system may include means for determining a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations. The system may also include means for providing the determined likelihood to the one or more entities.

In one implementation, the system may also include means for limiting one or more operations of the vehicle in response to determining that the at least one driving score exceeds the threshold value. In some instances, the one or more operations may include limiting a speed of the vehicle or limiting the vehicle to a speed within a certain amount or percentage over a posted speed limit, disabling or limiting one or more features of an infotainment system of the vehicle, disabling or restricting one or more features of a manual driving mode of the vehicle, disabling or restricting one or more features of an autonomous driving mode of the vehicle, restricting travel of the vehicle to certain areas or along certain routes, requiring the vehicle to increase spacings between the vehicle and other vehicles, disabling the vehicle for period of time after the vehicle arrives at a destination, or any combination thereof. In another implementation, the system may also include means for instructing other vehicles to stay away from the vehicle or increase distances between the vehicle and the other vehicles. In another implementation, the system may also include means for instructing one or more road-side cameras or road-side sensors to focus on the vehicle.

In various implementations, a non-transitory computer-readable medium storing computer executable code is disclosed. Execution of the computer executable code by one or more processors of a system may cause the system to perform a number of operations. In some implementations, the operations may include determining one or more driving scores for a vehicle based on observations of a driving behavior of the vehicle during a time period. The operations may include generating an indication of unsatisfactory driving based on at least one of the one or more driving scores exceeding a threshold value. The operations may include providing the indication of unsatisfactory driving to one or more entities. In some instances, the indication of unsatisfactory driving may be generated only if the one or more driving scores exceed the threshold value for more than a portion or percentage of the time period.

The vehicle may be any suitable vehicle such as (but not limited to) an autonomous vehicle, a semi-autonomous vehicle, an autonomous vehicle configured for passenger service, or a vehicle operated by a human driver and equipped with ADAS. In some implementations, the one or more entities may include (but are not limited to) a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the observations may be received from one or more devices via a PDSCH of a 5G NR system, a V2X channel of the 5G NR system, a V2I channel of the 5G NR system, a 4G RAN, a P2P communication link, a DSRC channel, a WLAN, or any combination thereof. In some implementations, the one or more devices may include (but are not limited to) road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

In some implementations, the operations may include identifying each occurrence of the vehicle ignoring traffic signs or violating traffic laws during the time period based on the observations received from the one or more devices. The operations may also include generating the indication of unsatisfactory driving based at least in part on the number of identified occurrences during the time period exceeding a threshold number.

In some other implementations, the operations may include identifying one or more dangerous driving attributes exhibited by the vehicle during the time period based on the observations received from the one or more devices. The operations may also include generating the indication of unsatisfactory driving based at least in part on the identified dangerous driving attributes. In some instances, the indication of unsatisfactory driving may be generated only if the one or more dangerous driving attributes identified during the time period exceeds a threshold number by more than an amount or percentage. The one or more dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

In some instances, the operations may include determining whether any of the identified dangerous driving attributes are no longer observed in the driving behavior of the vehicle. The operations may also include adjusting the one or more driving scores based on the determination. In some other instances, the operations may include generating a report indicating the number of dangerous driving attributes identified during the time period. The operations may also include providing the report to the one or more entities.

In various implementations, the operations may include receiving a first indication of a first speed of the vehicle during a first portion of the time period from one or more first devices. The operations may also include receiving a second indication of a second speed of the vehicle during a second portion of the time period from one or more second devices. The operations may also include determining whether the vehicle exceeded a speed limit by more than an amount or exceeded the speed limit for more than a duration of time based on the first and second indications. In some implementations, the generation of the indication of unsatisfactory driving may be based at least in part on a determination that the vehicle exceeded the speed limit by more than the amount or exceeded the speed limit for more than the duration of time.

In some implementations, the operations may include determining a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations. The operations may also include providing the determined likelihood to the one or more entities.

In one implementation, the operations may also include limiting one or more operations of the vehicle in response to determining that the at least one driving score exceeds the threshold value. In some instances, the one or more operations may include limiting a speed of the vehicle or limiting the vehicle to a speed within a certain amount or percentage over a posted speed limit, disabling or limiting one or more features of an infotainment system of the vehicle, disabling or restricting one or more features of a manual driving mode of the vehicle, disabling or restricting one or more features of an autonomous driving mode of the vehicle, restricting travel of the vehicle to certain areas or along certain routes, requiring the vehicle to increase spacings between the vehicle and other vehicles, disabling the vehicle for period of time after the vehicle arrives at a destination, or any combination thereof. In another implementation, the operations may also include instructing other vehicles to stay away from the vehicle or increase distances between the vehicle and the other vehicles. In another implementation, the operations may also include instructing one or more road-side cameras or road-side sensors to focus on the vehicle.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
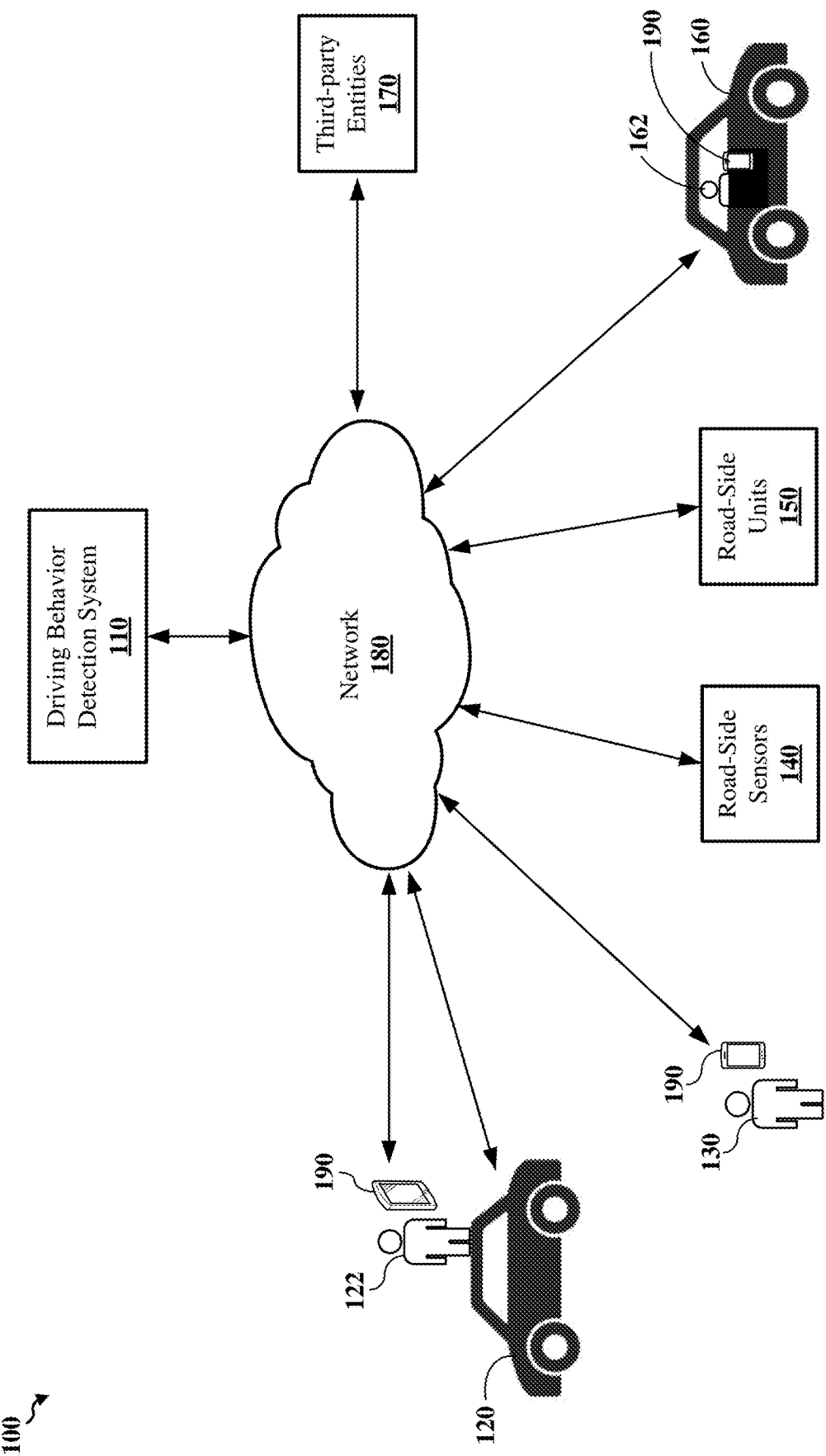
FIG. 1 shows a pictorial diagram of an example environment within which various aspects of the present disclosure can be implemented.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Thus, although described herein with respect to autonomous or semi-autonomous vehicles (also known as self-driving cars or "SDCs"), aspects of the present disclosure may be implemented within other vehicles such as (but not limited to) cars, trucks, motorcycles, buses, boats, helicopters, robots, unmanned aerial vehicles, recreational vehicles, amusement park vehicles, construction equipment, and golf carts. Various aspects of the present disclosure may also or alternatively apply to a vehicle driven by a human.

As discussed, some vehicles can operate in an autonomous or semi-autonomous mode and navigate through an environment with little or no input from a human driver. These vehicles, collectively referred to herein as autonomous vehicles, typically include a number of sensors that can determine information about the environment in which the vehicle operates. For example, the sensors can provide mapping information from which a three-dimensional (3D) representation of the surrounding environment can be generated. This 3D representation, which in some implementations can be a 3D point cloud, may be used by the autonomous vehicle to select a driving route and then safely navigate along the selected route in a manner that avoids collisions and obeys various traffic signs, traffic laws, and other rules of the road. The sensors can also provide information indicating the presence of objects in the surrounding environment, as well as various features, attributes, positions, and movements of the detected objects.

Despite continuing advancements in objection detection, object tracking, and decision-making capabilities, autonomous vehicles remain prone to accidents, erratic maneuvers, and dangerous driving. Differences between navigation platforms, risk assessment protocols, and collision avoidance systems employed by various autonomous vehicles may increase the likelihood of accidents, erratic maneuvers, and dangerous driving of autonomous vehicles. Moreover, vehicles driven by humans are also prone to accidents, erratic maneuvers, and dangerous driving. Thus, there is a need for systems and methods that can monitor the driving behavior of vehicles and generate indications of whether a respective one or more of the monitored vehicles is driving in an unsatisfactory manner (e.g., a manner that may be considered as dangerous or unsafe driving), that is likely to result in an accident, or that is likely to cause injury to occupants of the respective monitored vehicles or to occupants of one or more other vehicles.

In accordance with some aspects of the present disclosure, driving behavior detection systems and methods are disclosed that can determine the driving behavior of a vehicle (e.g., whether the vehicle is driving in an unsatisfactory manner, whether the vehicle exhibits one or more dangerous driving attributes, or whether the vehicle exhibits some other unsafe or risky driving behavior). In some implementations, the driving behavior detection systems and methods disclosed herein can also determine whether the vehicle is driving in a manner that is likely to result in an accident, likely to cause injury to occupants of the vehicle, and/or likely to cause injury to occupants of one or more other vehicles. In some instances, the driving behavior detection systems and methods disclosed herein can generate indications of a respective vehicle driving in an unsafe or unsatisfactory manner, indications of the respective vehicle exhibiting one or more dangerous driving attributes, indications of the respective vehicle driving in a manner likely to result in an accident, or indications of the respective vehicle driving in a manner likely to cause injury to occupants of the respective vehicle and/or injury to occupants of one or more other vehicles. In various implementations, these indications can be sent to one or more third-party entities including (but not limited to) a driver of the vehicle, an occupant of the vehicle, an owner of the vehicle, a heads-up display of the vehicle, an insurer of the vehicle, a law enforcement agency, one or more police vehicles, a government motor vehicle agency, one or more other vehicles, and/or other interested party/parties (e.g., a rideshare operator). In this way, the driving behavior detection systems and methods disclosed herein can alert the appropriate entities that a particular vehicle is driving in an unsatisfactory (or otherwise risky) manner and/or that the particular vehicle exhibits one or more dangerous driving attributes.

Several aspects of autonomous vehicles will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a pictorial diagram of an example environment 100 within which various aspects of the subject matter disclosed herein may be implemented. The environment 100 is shown to include (but is not limited to) a driving behavior detection system 110, a vehicle 120, a pedestrian 130, one or more road-side sensors 140, one or more road-side units (RSUs) 150, another vehicle 160, one or more third-party entities 170, a communications network 180, and a number of mobile computing devices 190. Although not shown in FIG. 1 for simplicity, the environment 100 can include other vehicles, people, objects, structures, obstacles, features, and the like (e.g., roads, buildings, bridges, tunnels, traffic signs, and so on).

The driving behavior detection system 110 may include any number of computing devices such as (but not limited to) workstations, servers, mainframe computers, personal computers, virtual machines, and machine learning models. The detection system 110 may include hardware, software, or embedded logic components or a combination of two or more such components for performing the various functions and operations described herein. In some aspects, the detection system 110 may send commands, instructions, or data to vehicle controllers (not shown in FIG. 1 for simplicity) provided within corresponding vehicles 120. The vehicle controllers may process the received commands, instructions, or data to cause their respective vehicles 120 to perform one or more operations or functions indicated by the detection system 110. In this way, the detection system 110 can monitor the driving behavior of a plurality of vehicles 120 concurrently.

In various implementations, the detection system 110 may observe a driving behavior of the vehicle 120 during a time period. The detection system 110 may determine one or more driving scores for the vehicle 120 based on the observed driving behavior. In some aspects, the driving scores may be compared with one or more threshold values to determine whether the driving behavior of the vehicle 120 is unsafe or unsatisfactory. For example, if one or more of the driving scores are greater than one or more corresponding threshold values, the detection system 110 may determine that the vehicle 120 is driving in an unsatisfactory manner. In response to the determination of unsatisfactory driving, the detection system 110 may generate an indication of unsatisfactory driving behavior of the vehicle 120. The indications may be provided to one or more of the entities 170.

Conversely, if the one or more driving scores are less than the corresponding threshold values, the detection system 110 may determine that the vehicle 120 is not driving in an unsatisfactory manner. In response to the determination that the vehicle 120 is not driving in an unsatisfactory manner, the detection system 110 may not generate the indication of unsatisfactory driving. In some other implementations, the detection system 110 may generate an indication of safe driving when all of the driving scores are less than corresponding safe threshold values.

In some implementations, the detection system 110 may determine whether the vehicle 120 ignored one or more traffic signs or violated one or more traffic laws during the time period. In some instances, the detection system 110 may identify each occurrence of the vehicle 120 ignoring a traffic sign or violating a traffic law. The detection system 110 may generate at least one of the driving scores based on the number of identified occurrences of ignoring traffic signs or violating traffic laws during the time period. In other implementations, the detection system 110 may determine whether the vehicle 120 exhibits one or more dangerous driving attributes during the time period. In some instances, the dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle. As such, one or more of the driving scores may be based at least in part on the detection of one or more dangerous driving attributes exhibited by the vehicle 120 during the time period.

In various implementations, the detection system 110 may generate one or more reports based on the observed driving behavior of the vehicle 120. For example, the detection system 110 may generate a report indicating which (and how many instances) of the dangerous driving attributes were exhibited by the vehicle 120 during a particular time period, along a particular road, or within a particular geographic area. The detection system 110 may also generate reports indicating one or more of the likelihood of the vehicle 120 being involved in a vehicular accident, the likelihood of the vehicle 120 causing injury to occupants of the vehicle 120, or the likelihood of the vehicle 120 causing injury to the occupants of one or more other vehicles. One or more of these indications or reports can be provided to one or more of the third-party entities 170.

In some implementations, the vehicle 120 may be a conventional vehicle driven by a human. In some other implementations, the vehicle 120 may be an autonomous vehicle capable of navigating through an environment with little or no assistance from a human driver. Although not shown in FIG. 1 for simplicity, an autonomous vehicle may include a vehicle controller, one or more communication interfaces, a heads-up display, a user interface, and other components associated with vehicles that can operate in an autonomous or semi-autonomous driving mode. In some instances, the vehicle 120 may be configured for passenger service. That is, the vehicle 120 may be configured to identify a passenger pick-up location, drive to the identified pick-up location and pick-up a passenger, drive to a selected drop-off location, and drop-off the passenger at the selected drop-off location. In the example of FIG. 1, the vehicle 120 is shown transporting a person 122 carrying a mobile computing device 190. The person 122 may be a passenger, driver, or observer of the vehicle 120.

The pedestrian 130 may be any person or persons in a position or vantage point from which to observe the driving behavior of the vehicle 120. For example, while standing on a sidewalk near an intersection, the pedestrian 130 may be in a position to witness the vehicle 120 running a stop sign at the intersection. In some instances, the pedestrian 130 may use the mobile computing device 190 to capture video of the vehicle 120 running the stop sign. The captured video may be sent to the detection system 110. The captured video may be analyzed by the detection system 110 to determine whether the vehicle 120 did, in fact, run the stop sign. Although only one pedestrian 130 is shown in FIG. 1 for simplicity, the environment 100 may include any suitable number of pedestrians.

The road-side sensors 140 may be or may include any suitable device that can provide information from which the location, velocity, direction of travel, or orientation of the vehicle 120 can be derived. In some aspects, the road-side sensors 140 may include (but are not limited to) cameras, video recorders, RADAR devices, LIDAR devices, acoustic sensors, and so on. For example, a road-side sensor 140 equipped with a camera may capture images of a nearby road within the field of view (FOV) of the camera. The captured images may be sent to the detection system 110. The detection system 110 may use the captured images to determine when the vehicle 120 passed through the camera's FOV. In some instances, the detection system 110 can analyze images captured by multiple road-side sensors 140 having known locations to determine the velocity of the vehicle 120 at one or more points along a particular route. In other instances, the detection system 110 can analyze images captured by multiple road-side sensors 140 to identify one or more instances at which the vehicle 120 changed lanes, swerved, drove erratically, and so on.

For another example, a road-side sensor 140 equipped with a video camera may record real-time video of a portion of road within the FOV of the video camera. The captured video may be sent to the detection system 110. The detection system 110 may use the captured video to observe the driving behavior of the vehicle 120. In some instances, the detection system 110 can analyze the captured video to determine whether the vehicle 120 violated one or more traffic laws, ignored one or more traffic signs, exhibited one or more dangerous driving attributes, and/or was driving in a manner likely to result in an accident or cause injury to occupants of the vehicle 120 or to occupants of one or more other vehicles 160.

In some instances, the road-side sensors 140 may include RADAR devices that can determine the position, velocity, and direction of the vehicle 120. In other instances, the road-side sensors 140 may include acoustic sensors that can detect other vehicles honking at the vehicle 120 (which may be an indication that the vehicle 120 is driving dangerously). In some other instances, the road-side sensors 140 may include wireless transceivers that can identify the vehicle 120 based on wireless signals (such as beacon signals) transmitted from the vehicle 120. These wireless signals can be analyzed to determine precisely when the vehicle 120 passed by each of the road-side sensors 140 equipped with such wireless transceivers. The indications of when the vehicle 120 passed by two road-side sensors 140 having known locations can be used to determine the velocity of the vehicle 120, and the indications of when the vehicle 120 passed by three or more road-side sensors 140 having known locations can be used to determine an acceleration of the vehicle 120.

The road-side sensors 140 may be deployed at any suitable location from which the driving behavior of the vehicle 120 can be observed. For example, in some instances, the road-side sensors 140 may be deployed alongside roads, highways, bridges, tunnels, and other throughways suitable for use by the vehicle 120. The road-side sensors 140 may be stand-alone devices, or may be attached to or mounted on other structures. For example, in some instances, the road-side sensors 140 may be situated on the ground or mounted on dedicated poles. In some other instances, the road-side sensors 140 may be mounted on other structures such as (but not limited to) telephone poles, traffic lights, traffic signs, bridges, overpasses, buildings, cellular towers, and the like.

The road-side units (RSUs) 150 may include any suitable wireless communication device that can relay wireless signals between one another, the detection system 110, and/or the vehicle 120. The RSUs 150 may have fixed locations known to the detection system 110, and can be used to determine the position, velocity, and direction of the vehicle 120 at different instances in time or at different locations. The RSUs 150 may use any suitable communications protocol including (but not limited to) cellular communications, Wi-Fi communications, peer-to-peer (P2P) communications, and/or satellite communications. In some implementations, the RSUs 150 may be Dedicated Short-Range Communication (DSRC) equipped devices that can communicate with one another using DSRC messages. A DSRC message is a wireless message that is specially configured to be sent and received by highly mobile devices such as vehicles and conventional vehicles. In other implementations, the RSUs 150 may be 5G-compatible devices that can use V2X communications (e.g., sidelink and PC5 connections) to transmit and/or receive data and other information to and/or from each other, the detection system 110, the vehicles 120 and 160, mobile computing devices 190, and/other suitable devices.

In some implementations, one or more of the RSUs 150 may be paired or associated with a number of road-side sensors 140. That is, some of the road-side sensors 140 may be associated with (e.g., in communication with) one or more corresponding road-side units 150. In some instances, some of the road-side sensors 140 may be part of corresponding road-side units 150. For example, a respective RSU 150 may relay images, video, measurements, and other information from one or more associated road-side sensors 140 to the detection system 110, and may relay commands, configuration data, or other information from the detection system 110 to the one or more associated road-side sensors 140.

In various implementations, wireless transceivers provided within or associated with one or more of the RSUs 150 may be used to identify the vehicle 120 based on wireless signals (such as beacon signals) transmitted from the vehicle 120. In some instances, the wireless transceiver of a respective RSU 150 can be used to determine the location of the vehicle 120 at a particular instance in time, for example, by exchanging one or more wireless signals with the vehicle 120. The location and timing information provided by a multitude of RSUs 150 having known locations may be used to determine the velocity and acceleration of the vehicle 120 at particular locations and/or at particular times.

In some implementations, the RSUs 150 may be configured to perform ranging operations with the vehicle 120. For example, the distance between a respective RSU 150 and the vehicle 120 may be determined based on the round-trip time (RTT) of a signal exchanged between the respective RSU 150 and the vehicle 120. The distances between the vehicle 120 and each of three or more RSUs 150 having known locations can be used to determine the precise location of the vehicle 120 using well-known trilateration techniques. In other implementations, the RSUs 150 may use other suitable positioning techniques including, for example, Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other positioning methods to determine the locations of the vehicle 120.

The other vehicles 160 may include autonomous vehicles, semi-autonomous vehicles, and conventional vehicles that are in a position or vantage point from which to observe the driving behavior of the vehicle 120. For instances in which the other vehicle is an autonomous vehicle, one or more sensors of the autonomous vehicle can be used to capture data, such as images, video, audio, or generate 3D point clouds from which the driving behavior of the vehicle 120 can be observed or determined. For instances in which the other vehicle is equipped with computer vision, the computer vision may be used to observe and record the driving behavior of the vehicle 120, at least while in range of the other vehicle.

In addition, or in the alternative, one or more occupants of the other vehicle 160 may use mobile computing devices 190 to capture data, such as image(s), video, and/or audio of the vehicle 120. The captured images, video, and/or audio may be sent to the detection system 110 to determine whether the vehicle 120 exhibited one or more dangerous driving attributes, ignored one or more traffic signs, violated one or more traffic laws, or drove in a manner likely to result in an accident or cause bodily injury. For example, if the vehicle 120 runs a red light while the other vehicle 160 is waiting in line at the same light, occupants of the other vehicle 160 may be able to capture images or video of the vehicle 120 running the red light using mobile computing devices 190. The captured images or video of the vehicle 120 may be transmitted to the detection system 110.

In some implementations, the third-party entities 170 may include (but are not limited to) one or more of a human driver of the vehicle 120, a human passenger of the vehicle 120, an owner of the vehicle 120, an insurer of the vehicle 120, a heads-up display of the vehicle 120, a law enforcement agency, one or more police vehicles, a government motor vehicle agency, or one or more other vehicles. In other implementations, the third-party entities 170 may include other suitable persons, agencies, services, or companies.

The communications network 180 provides communication links between the detection system 110, the vehicle 120, the pedestrian 130, the road-side sensors 140, the RSUs 150, the other vehicles 160, the third-party entities 170, and the mobile computing devices 190. The network 180 may be any suitable one or more communication networks including, for example, the Internet, a wide area network (WAN), a metropolitan area network (MAN), a wireless local area network (WLAN), a personal area network (PAN), a radio access network (RAN) such as a Fifth Generation (5G) New Radio (NR) system, a wired network, a cable network, a satellite network, or other suitable network.

The mobile computing devices 190 may be any suitable device capable of communicating with the detection system 110 via the communications network 180. In some instances, the mobile computing devices 190 may be cellular telephones, smartphones, smartwatches, headsets, or other mobile computing devices. In other instances, one or more of the mobile computing devices 190 may be a laptop computer, a personal digital assistant, a tablet computer, a game console, or an electronic book reader.

Figure 2:
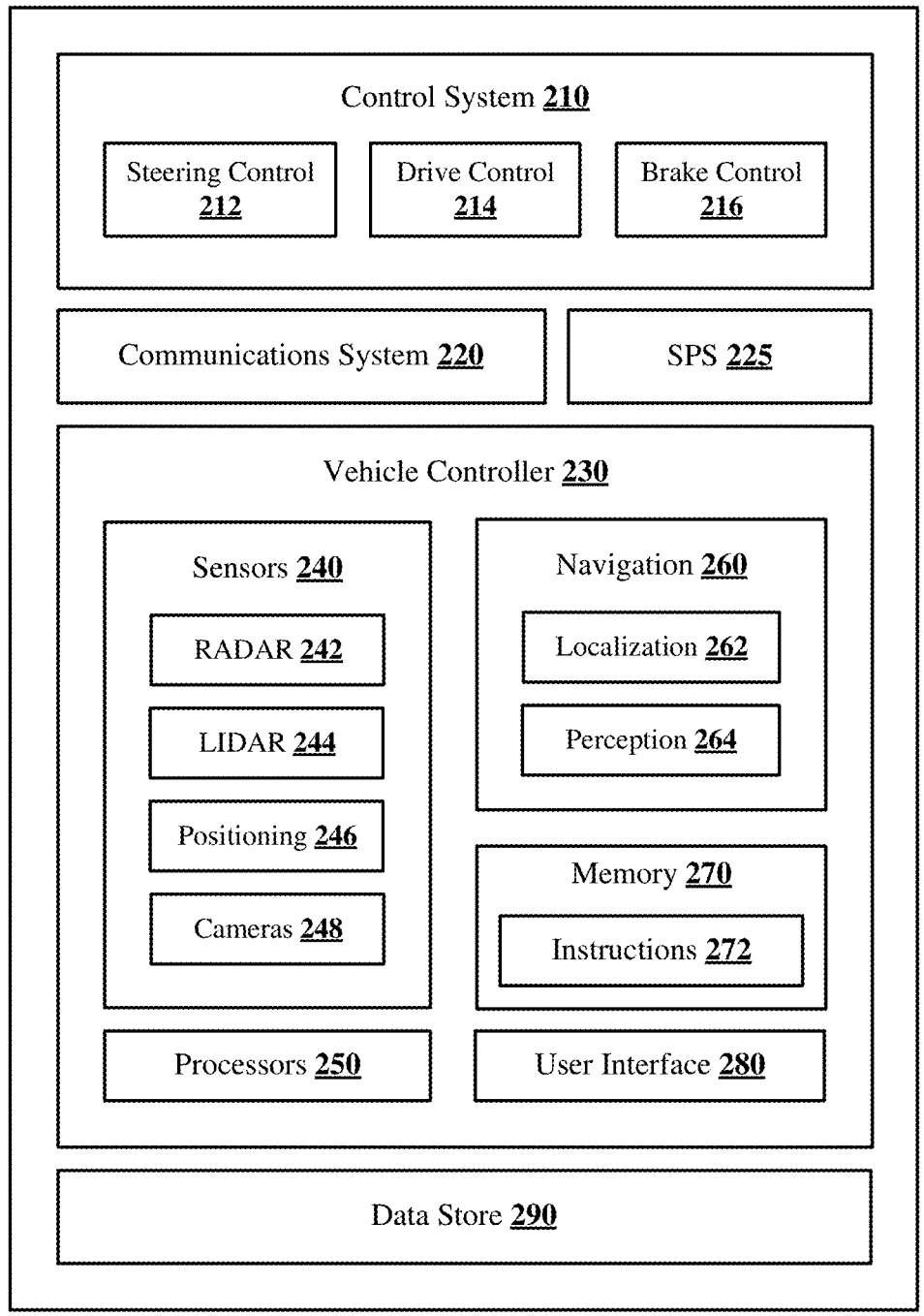
FIG. 2 shows a block diagram of an example autonomous vehicle, according to some implementations.

FIG. 2 shows a block diagram of an autonomous vehicle 200, according to some implementations. The autonomous vehicle 200, which may be one example of the vehicle 120 of FIG. 1, is shown to include a control system 210, a communications system 220, a satellite positioning system (SPS) unit 225, a vehicle controller 230, and a data store 290. Other components of the autonomous vehicle 200 are not shown for simplicity. The autonomous vehicle 200 may be implemented as any number of different types of vehicles, including vehicles capable of transporting people and/or cargo, and capable of traveling in various environments, and it will be appreciated that the aforementioned components can vary widely based upon the type of vehicle within which these components are utilized.

The control system may include steering control 212, drive control 214, and brake control 216. The steering control 212 may include one or more actuators and/or sensors for controlling and receiving feedback from the direction or steering components to enable the vehicle 200 to follow a desired trajectory. The drive control 214 may be configured to control a powertrain of the autonomous vehicle 200. The brake control 216 may be configured to control one or more brakes that slow or stop vehicle 200.

The communications system 220 may be used to establish and maintain communications links between the autonomous vehicle 200 and the detection system 110, one or more associated vehicle controllers, and one or more mobile computing devices 190. The communications system 220 may use any suitable communications protocol including, for example, wireless communications protocols specified by one or more Releases of the 3GPP, by one or more amendments to the IEEE 802.11 family of wireless communication standards, the Bluetooth Interest Group, or other suitable communications technology.

The SPS unit 225 may receive and decode satellite signals associated with various global satellite services such as the Global Positioning System (GPS), the Global Navigation Satellite System (GLONASS), and Galileo, as well as various regional satellite services such as the Indian Regional Navigation Satellite System (IRNSS). The satellite signals can be used by the autonomous vehicle for general positioning, navigation, and mapping purposes.

The vehicle controller 230, which may be implemented using any analog, digital, or mixed signal processing circuitry to control various operations of the autonomous vehicle 200, is shown to include sensors 240, processors 250, a navigation system 260, a memory 270, and a user interface 280. The vehicle controller 230 may interface with the autonomous vehicle's control system 210, and may be used to control various operations of the autonomous vehicle 200 including (but not limited to) assuming control of the autonomous vehicle 200, providing instructions to the autonomous vehicle 200, configuring the autonomous vehicle 200 for passenger service, disabling the autonomous vehicle 200, restricting one or more operations of the autonomous vehicle 200, and limiting one or more driving metrics of the autonomous vehicle 200. For example, in some instances, the vehicle controller 230 may be used to limit one or more of a maximum speed of the autonomous vehicle 200, a driving distance of the autonomous vehicle 200, and so on.

The sensors 240 may include any suitable sensors or devices that can be used, individually or in conjunction with one another, to scan a surrounding environment for objects, other vehicles, roads, road conditions, traffic signs, traffic lights, weather conditions, environmental features, buildings, hazardous conditions, and other attributes, characteristics, or features of the surrounding environment. In some implementations, the sensors 240 may include RADAR 242, LIDAR 244, positioning sensors 246, cameras 248, and other suitable sensing devices. The RADAR 242 and LIDAR 244 systems may be used to detect a presence of objects in the surrounding environment, and to determine distances between the objects and the autonomous vehicle 200. The positioning sensors 246 can be used to determine the location of the vehicle on the Earth using satellite signals. The cameras 248 may be or may include a camera, a video recorder, image sensor, or any other suitable device or component capable of capturing images, video, and/or audio of at least a portion of the surrounding environment.

In some implementations, the LIDAR system 244 can emit or transmit light pulses into an environment and can receive light pulses reflected by objects and other reflective surfaces in the environment to determine information about the objects and the other reflective surfaces. In some aspects, the distance to a detected object may be determined based on a time between emission of a light pulse by the LIDAR system 244 and reception of a corresponding reflected light pulse by the LIDAR system 244. The size, shape, orientation, texture, and other features of the detected object may be determined based (at least in part) on the amplitudes, pulse widths, timing information, and other characteristics of a multitude of such received light pulses. Information generated from the received light pulses may be used to generate a point cloud indicating the location, size, shape, movement, orientation, and other features of objects and other reflective surfaces detected in the environment. The measured distances can be combined with orientations of the lasers to associate a 3D position with each light pulse received by the LIDAR system. The 3D positions associated with a plurality of received light pulses may be used to generate a 3D map of points indicative of locations of reflective features in the environment. The autonomous vehicle 200 can use one or more of these 3D point clouds to navigate through the environment (such as along a route between drop-off or pick-up locations) without human input.

The navigation system 260 may be provided in any suitable location on or within the autonomous vehicle 200. The navigation system 260 may be used to navigate the autonomous vehicle 200 from one or more points of origin to one or more destinations. For example, the navigation system 260 can use map data and sensor data to guide the autonomous vehicle 200 to destinations without colliding into (or otherwise avoiding) other objects. In some implementations, the navigation system 260 may access or receive detailed map information (such as 3D point clouds) that includes information about roads, bridges, buildings, landmarks, elevations, construction zones, real-time traffic conditions, weather information, event information, and the like from one or more sources such as (but not limited to) governmental institutions, subscription-based services, user-generated map collections, crowdsourced mapping information, mapping information provided by other autonomous vehicles, and so on. In some instances, the detailed map information can be provided by a network entity or server. In other instances, the detailed map information (or at least portions thereof) can be provided by one or more other autonomous vehicles via a suitable wireless channel (such as a V2V channel of a 5G RAN, a sidelink channel of a RAN, an unlicensed frequency band, or a dedicated short range communication (DSRC) channel of a wireless network).

In various implementations, the detailed map information can be used to select one or more routes suitable for the autonomous vehicle 200. The detailed map information can also be used determine whether previously selected routes remain viable for the autonomous vehicle 200, and to select one or more alternate routes for the autonomous vehicle 200. In particular implementations, this may be done before the autonomous vehicle 200 begins driving to a particular destination. In this way, the speed and efficiency with which the autonomous vehicle 200 can select the fastest or most convenient route to the particular destination may be significantly greater than conventional autonomous vehicles 200 that use only on-board sensors to provide mapping information. In some implementations, the detailed map information can be fused, stitched, or filtered with mapping information provided by or derived from the sensors 240, either periodically or continuously (such as in real-time).

In the example of FIG. 2, the navigation system 260 is shown to include a localization subsystem 262 and a perception subsystem 264. The localization subsystem 262 may be used for determining the location and orientation of the autonomous vehicle 200 within its surrounding environment, and generally within some frame of reference. In some aspects, the location of the autonomous vehicle 200 can be compared with the location of one or more other vehicles in the same environment as part of generating training data for one or more of the machine learning models utilized by the detection system 400 of FIG. 4. The perception subsystem 264 may be used for detecting, tracking, and/or identifying objects within the environment surrounding the autonomous vehicle 200. In some aspects, data generated by the perception subsystem 264 can be used to train one or more of the machine learning models utilized by the detection system 400 of FIG. 4. The navigation system 260 may use results data generated by the localization subsystem 262 and the perception subsystem 264 to predict a trajectory for the autonomous vehicle 200 over a given time period and/or to a particular destination. In some aspects, one or more of the predicted trajectories may be used to train one or more of the machine learning models utilized by the detection system 400 of FIG. 4.

The user interface 280 may be or may include any suitable devices or components through which the autonomous vehicle 200 can present questions, options, or other information to an operator or passengers, and/or through which the operator or passengers may provide answers or other responsive information to the autonomous vehicle 200. In some instances, the user interface 280 may include tablet computers, touch-sensitive displays, speakers, microphones, and the like. In other implementations, a passenger or operator may exchange communications with the autonomous vehicle 200 using an app residing on a computing device (such as the mobile computing devices 190) or using a web browser.

The data store 290 may store navigation information, weather information, user profiles, safety information, driving scores, and other information pertaining to the autonomous vehicle 200, the surrounding environment, and/or passengers or users of the autonomous vehicle 200. For example, the navigation data may include route information for rides requested by passengers or users, road conditions, traffic information, road conditions, weather conditions, construction activity, and any other information associated with operation of the autonomous vehicle 200. In some instances, the navigation data may include map data and/or sensor data such as street views of particular areas, satellite views of particular areas, and the like.

Figure 3:
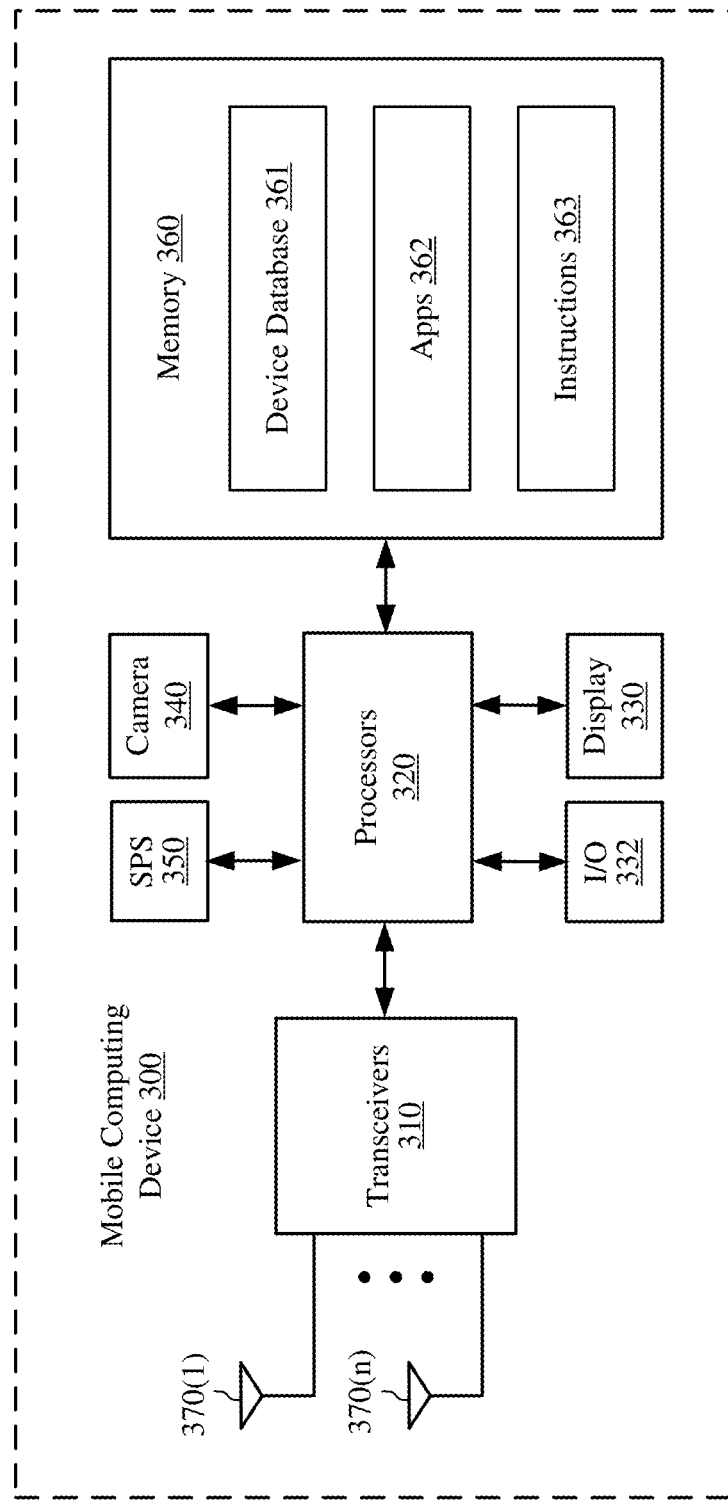
FIG. 3 shows a block diagram of an example mobile computing device, according to some implementations.

FIG. 3 shows a block diagram of a mobile computing device 300, according to some implementations. The mobile computing device 300, which may be one example of the mobile computing devices 190 of FIG. 1, is shown to include one or more transceivers 310, one or more processors 320, a display 330, I/O components 332, a camera 340, an SPS unit 350, a memory 360, and a number of antennas 370(1)-370(n). The transceivers 310 may be coupled to the antennas 370(1)-370(n), either directly or through an antenna selection circuit (not shown for simplicity), and can be used to transmit signals to and receive signals from other devices. In some instances, the transceivers 310 can facilitate wireless communications between the mobile computing device 300 and the detection system 110 of FIG. 1. Although not shown in FIG. 3 for simplicity, the transceivers 310 can include any number of transmit chains to process and transmit signals to other wireless devices via the antennas 370(1)-370(n), and can include any number of receive chains to process signals received from the antennas 370(1)-370(n). A baseband processor (not shown for simplicity) can be used to process signals received from the processors 320 or the memory 360 (or both) and to forward the processed signals to the transceivers 310 for transmission via one or more of the antennas 370(1)-370(n), and can be used to process signals received from one or more of the antennas 370(1)-370(n) via the transceivers 310 and to forward the processed signals to the processors 320 or the memory 360 (or both).

The processors 320 can be any suitable one or more processors capable of executing scripts or instructions of one or more software programs stored in the mobile computing device 300 (such as within the memory 360). In some implementations, the processors 320 can be or include one or more microprocessors providing processor functionality and include external memory providing at least a portion of machine-readable media. In other implementations, the processors 320 can be or include an Application Specific Integrated Circuit (ASIC) with the processor, the bus interface, the customer interface, and at least a portion of the machine-readable media integrated into a single chip. In some other implementations, the processors 320 can be or include one or more Field Programmable Gate Arrays (FPGAs) or Programmable Logic Devices (PLDs).

The display 330 can be any suitable display or screen upon which information can be presented to a user. In some instances, the display 330 can be a touch-sensitive display that allows the user to control, interact with, or initiate a number of functions and operations of the mobile computing device 300. The I/O components 332 can be or include any suitable mechanism, interface, or device to receive input (such as commands) from the user and to provide output to the user. For example, the I/O components 332 may include (but are not limited to) a graphical customer interface, keyboard, mouse, microphone, speakers, and so on. In some instances, the I/O components 332 can work in conjunction with the display 330. In some other instances, the I/O components 332 can include, or can be part of, the display 330.

The camera 340 may be or may include a camera, a video recorder, or any other suitable device or component capable of capturing images, video, and/or audio of a scene. For example, a user of the mobile computing device 300 may use the camera 340 to capture images, video, and/or audio of the vehicle 120 driving along a street or road, approaching an intersection, stopped at stop sign, and so on. The captures images, video, and/or audio of the vehicle 120 can be transmitted to the detection system 110 of FIG. 1 via the transceivers 310 and antennas 370(1)-370(n).

The SPS unit 350 may receive and decode satellite signals associated with various global satellite services such as GPS, GLONASS, and Galileo, as well as various regional satellite services such as the IRNSS. The satellite signals can be used by the mobile computing device 300 for general positioning and navigation purposes.

The memory 360 can include a device database 361 that stores profile information for the mobile computing device 300. The device database 361 can also store information associated with the detection system 110 of FIG. 1. The memory 360 can also store a number of mobile apps 362. In some aspects, at least one of the mobile apps 362 may be a driving behavior detection app associated with the detection system 110 of FIG. 1. For example, the driving behavior detection app may be used to interface with and send captured images, video, or audio of a vehicle to the detection system 110. In various implementations, the memory 360 may also include a non-transitory computer-readable medium (such as one or more nonvolatile memory elements, such as EPROM, EEPROM, Flash memory, a hard drive, and so on) that may store computer-executable instructions that, when executed by the processors 320, cause the mobile computing device 300 to perform one or more corresponding operations.

Referring also to FIG. 1, the mobile computing device 300 may be used by pedestrians 130, occupants of other vehicles 160, or other persons suitably positioned to capture data, such as images and/or video from which the driving behavior of the vehicle 120 can be observed or determined. For one example, a pedestrian walking near an intersection may use the mobile computing device 300 to capture images and/or video of the vehicle 120 stopping for a red light at the intersection or driving through the intersection without stopping for the red light. For another example, a passenger 162 in another vehicle 160 at the intersection may use his or her mobile computing device 300 to capture images and/or video of the vehicle 120 stopping for the red light at the intersection or driving through the intersection without stopping for the red light. In some instances, the mobile computing device 300 may transmit the captured images and/or video to the detection system 110 via the communications network 180.

Figure 4:
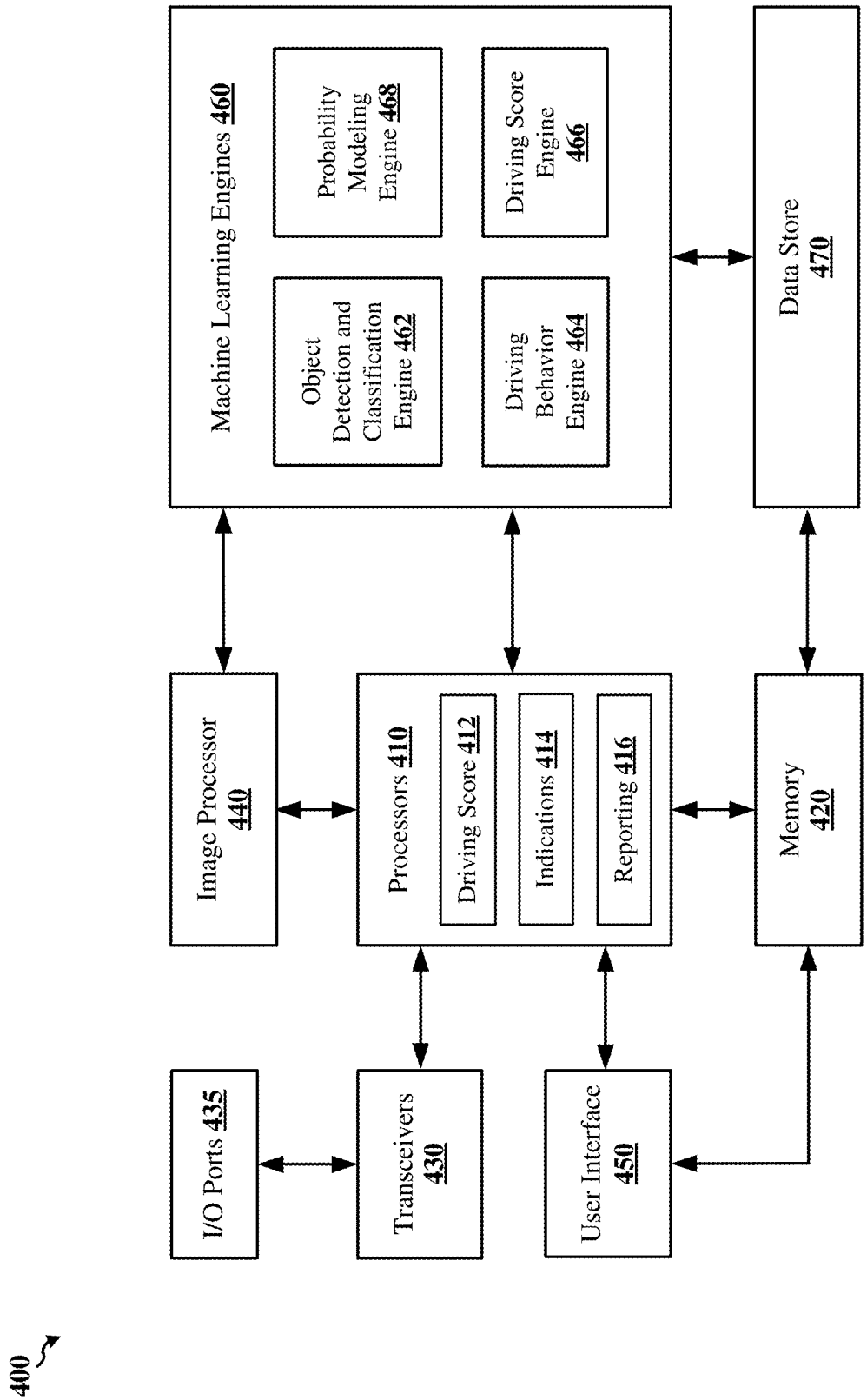
FIG. 4 shows a functional block diagram of the driving behavior detection system of FIG. 1, according to some implementations.

FIG. 4 shows a functional block diagram of an example driving behavior detection system 400 according to some implementations. The detection system 400, which may be one example of the detection system 110 of FIG. 1, is shown to include one or more processors 410, a memory 420, one or more transceivers 430, input/output (I/O) ports 435, an image processor 440, a user interface 450, machine learning engines 460, and a data store 470. The one or more processors 410 may be or may include any number of commercially available microprocessors or central processing units (CPUs) capable of executing scripts or instructions of one or more software programs stored in associated memory (such as memory 420). In addition, or in the alternative, the processors 410 may be or may include any number of Application Specific Integrated Circuits (ASICs), Field Programmable Gate Arrays (FPGAs), Programmable Logic Devices (PLDs), Graphics Processing Units (GPUs), Digital Signal Processors (DSPs), Data Processing Units (DPUs), microcontrollers, hardware accelerator(s), or any combination thereof.

The memory 420 may be any suitable memory that includes a non-transitory computer-readable medium including one or more nonvolatile memory elements (such as EPROM, EEPROM, Flash memory, a hard drive, etc.) capable of storing instructions that, when executed by the one or more processors 410, cause the system 400 to perform at least some of the operations described with reference to one or more of FIGS. 6, 7, 8, 9, 10, 11, and 12. In some implementations, the instructions or executable code stored in the memory 420 may be associated with one or more of a driving score program 412, an indications program 414, or a reporting program 416 that can be executed by the processors 410. For example, in some aspects, the driving score program 412 may be executed to determine one or more driving scores for the vehicle 120 based on the observed driving behavior of the vehicle 120. The indications program 414 may be executed by the processors 410 to generate indications of an unsatisfactory driving behavior of the vehicle 120. The indications program 414 may also be executed by the processors 410 to generate indications of the likelihood of the vehicle 120 being involved in an accident or causing injury to occupants of the vehicle 120 (or to occupants of one or more other vehicles). The reporting program 416 may be executed to generate reports indicating one or more of the unsatisfactory driving behavior of the vehicle 120, one or more dangerous driving attributes exhibited by the vehicle 120 (if any), the likelihood of the vehicle 120 being involved in an accident, the likelihood of the vehicle 120 causing injury to occupants of the vehicle 120, and/or the likelihood of the vehicle 120 causing injury to occupants of one or more other vehicles. In various implementations, the indications and the reports may be transmitted to one or more of the third party entities 170 of FIG. 1.

The transceivers 430, which may be coupled to the I/O ports 435 and the processors 410, may be used to transmit information to one or more other devices, systems, or entities and to receive information from the one or more other devices, systems, or entities. For example, the transceivers 430 may facilitate the exchange of communications (such as signals and messages) between the vehicle 120, the pedestrians 130, the road-side sensors 140, the RSUs 150, the one or more other vehicles 160, the one or more entities 170, and the mobile computing devices 190. Although not shown in FIG. 4 for simplicity, the transceivers 430 can include any number of transmit chains to process and transmit signals to other wireless devices via the I/O port 435 and the communications network 180 of FIG. 1, and can include any number of receive chains to process signals received from the I/O port 435. The transceivers 430 may be configured to operate according to one or more suitable wireless communication protocols such as (but not limited to) wireless communications protocols specified by one or more Releases of the Third Generation Partnership Project (3GPP), by one or more amendments to the IEEE 802.11 family of wireless communication standards, the Bluetooth Interest Group, or other suitable communications technology. In various implementations, the transceivers 430 may also be configured for one or more suitable wired communication protocols including (but not limited to) Ethernet, coaxial, or optical communications.

The I/O ports 435 may include one or more wireless communication interfaces and/or one or more wired communication interfaces. The one or more wireless communication interfaces may include antennas, antenna ports, antenna switching circuitry, and other components that can transmit wireless signals to and receive wireless signals from other devices or systems. The one or more wired communication interfaces may include (but are not limited to) an Ethernet interface, a coaxial cable interface, or an optical interface.

The image processor 440, which may be coupled to the processors 410 and the memory 420, may receive raw image and video data from one or more of the pedestrians 130, the road-side sensors 140, the RSUs 150, the other vehicles 160, mobile computing devices 190, or other suitable sources. In some implementations, the image processor 440 may include one or more image processing circuits that can process raw image and video data to identify various roadway features (such as roads, bridges, tunnels, intersections, traffic signs and signals, and the like), the vehicle 120, pedestrians 130, the other vehicles 160, and various other objects, conditions, or attributes of a given environment. In some aspects, the image processor 440 may be a general purpose processing unit that executes instructions stored in memory (such as memory 420). In other aspects, the image processor 440 may be an application-specific integrated circuit (ASIC) configured to identify various objects, features, and characteristics of a scene captured by the raw image and video data. In some other aspects, the image processor 440 may include a combination of specific hardware and the ability to execute instructions stored in memory.

In various implementations, the image processor 440 may fuse, stitch, or otherwise combine image or video data received from different sources (such as from a plurality of the road-side sensors 140 and/or RSUs 150, from a combination of the pedestrians 130, road-side sensors 140 and/or RSUs 150, other vehicles 160, or the mobile computing devices 190, and so on) to generate a composite 3D point cloud of a particular scene. For example, the image processor 440 can fuse, stitch, or otherwise combine image data of an intersection provided by a traffic camera, image data of the intersection provided by a pedestrian's smartphone, and image data of the intersection provided by an occupant of another vehicle to generate composite image data of the intersection. In some aspects, the image processor 440 can generate a 3D point cloud of the intersection based on the composite image data. The 3D point cloud can be provided to the machine learning engines 460 for further analysis or processing.

The user interface 450 may be coupled to the one or more processors 410 and the memory 420. The user interface 450 can provide a mechanism through which a user can send commands, indications, alerts, and other information to the vehicle 120, and through which the user can receive status information, location information, reports, and other information from the vehicle 120. The user interface 450 may also provide a mechanism through which the user can send indications and reports to one or more of the third-party entities 170. In some instances, the user interface 450 may include a display screen, a keyboard, a mouse, speakers, microphones, and/or other suitable input/output mechanisms.

The machine learning engines 460 may be coupled to the processors 410, the image processor 440, and data store 470. The machine learning engines 460 may include an object detection and classification engine 462, a driving behavior engine 464, a driving score engine 466, and a probability modeling engine 468. In various implementations, the machine learning engines 460 may receive raw image and video data from external sources such as (but not limited to) the pedestrians 130, the road-side sensors 140, the RSUs 150, the other vehicles 160, or the mobile computing devices 190. In some implementations, the machine learning engines 460 may receive processed image and video data from the image processor 440. Additionally, in some aspects, the machine learning engines 460 may receive sensing, imaging, and/or mapping data from one or more of the RADAR system 242, LIDAR system 244, the cameras 248, or other components of the vehicle 200 of FIG. 2.

The object detection and classification engine 462 may parse and analyze the received data to detect and classify various objects in an environment, scene, or geographic area of interest. In various implementations, the object detection and classification engine 462 may process the received data using a trained machine learning model to generate one or more bounding boxes corresponding to a portion of a 3D point cloud or map that includes a particular object. In some aspects, the machine learning model may be trained using previously captured image data, video data, and/or 3D mapping information indicating the features and location of each traffic sign in a geographic area of interest.

In some implementations, the object detection and classification engine 462 may generate, for each of the bounding boxes, one or more classifications indicating a category and type of the particular object. The category and type of each detected object may indicate how data associated with the respective object is further processed. In some implementations, the categories may correspond to one or more classifications used by the object detection and classification engine 462. In some aspects, at least some categories may be associated with vehicles, pedestrians, traffic signs, roadway features, weather conditions, and so on, and the types may indicate a specific type of object belonging to a respective category. For example, a stop sign may belong to the traffic sign category, and may have a type indicating the stop sign. For another example, a speed limit sign may belong to the traffic sign category and may have a type indicating the speed limit of a respective road or highway. As another example, the vehicle 120 may belong to the vehicle category, and may have a type indicating the vehicle. For another example, another vehicle 160 may belong to the vehicle category, and may have a type indicating other vehicles.

The driving behavior engine 464 may parse and analyze the received data to determine whether the vehicle 120 ignored a particular traffic sign and/or violated a particular traffic law. In various implementations, the driving behavior engine 464 may identify each occurrence of the vehicle 120 ignoring the particular traffic sign or violating the particular traffic law during a certain time period or within a certain geographic area. In some aspects, the driving behavior engine 464 may generate outputs indicating a level of compliance and/or a level of deviation between the observed driving behavior of the vehicle 120 and an expected driving behavior. In some implementations, the driving behavior engine 464 may process the received data using a machine learning model trained to identify and classify traffic signs and traffic laws. The machine learning model may be trained using historical data indicating one or more expected driving behaviors associated with each of a plurality of different traffic signs and traffic laws.

In some implementations, the driving behavior engine 464 may determine whether the vehicle 120 ignored a particular traffic sign by correlating the observed driving behavior of the vehicle 120 with the expected driving behavior corresponding to the particular traffic sign. For example, the driving behavior engine 464 may determine that the vehicle 120 ignored a stop sign based on a correlation between the observed driving behavior of the vehicle 120 (e.g., did not stop at the stop sign) and the corresponding expected behavior (e.g., stop at the stop sign). In other implementations, the driving behavior engine 464 may determine whether the vehicle 120 ignored the particular traffic sign based on sensor data received from one or more of the road-side sensors 140, the RSUs 150, the other vehicles 160, or the mobile computing devices 190. For example, the driving behavior engine 464 may determine that the vehicle 120 ignored a speed limit sign by comparing velocity information of the vehicle 120 (e.g., provided by or derived from sensor data provided by one or more of the vehicle 120, the road-side sensors 140, the RSUs 150, the other vehicles 160, or the mobile computing devices 190) with the indicated speed limit.

In various implementations, the driving behavior engine 464 may determine whether the vehicle 120 ignored a particular traffic law by correlating the observed driving behavior of the vehicle 120 with the expected driving behavior corresponding to the particular traffic law. In some aspects, the driving behavior engine 464 may determine the expected driving behavior associated with the particular traffic law, and correlate the observed driving behavior of the vehicle 120 with the expected driving behavior to determine the level of compliance with, or the level of deviation from, the particular traffic law. The determined level of compliance or deviation may be compared with a corresponding threshold value to determine whether the vehicle 120 violated the particular traffic law.

For example, if the vehicle 120 is observed crossing a double-yellow line of a road by a few inches for less than a certain time period (such as 2 or 3 seconds), the driving behavior engine 464 may determine that the vehicle 120 did not violate traffic laws which prohibit crossing double-yellow lines of streets, roads, and highways. Conversely, if the driving behavior engine 464 determines that an entirety of the vehicle 120 crossed the double-yellow line more than a certain number of times or for more than a certain distance (such as crossing over the double-yellow line a dozen times in less than a mile), the driving behavior engine 464 may determine that the vehicle 120 violated traffic laws prohibiting crossing double-yellow lines of streets, roads, and highways.

In some implementations, the driving behavior engine 464 may parse and analyze the received data to determine one or more driving attributes of the vehicle 120. The one or more driving attributes, which may be indicative of the driving behavior of the vehicle 120, may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle. In some aspects, the driving behavior engine 464 may determine deviations between one or more of the dangerous driving attributes exhibited by the vehicle 120 and one or more respective threshold levels. In addition, or in the alternative, the driving behavior engine 464 may determine whether any of the dangerous driving attributes previously exhibited by the vehicle 120 are no longer present.

The driving score engine 466 may determine driving scores or metrics for the vehicle 120 based on one or more outputs generated by the driving behavior engine 464. In various implementations, the driving score engine 466 may generate a driving score based on the number of occurrences in which the vehicle 120 ignored traffic signs or violated traffic laws during a certain time period or within a certain geographic area. In some implementations, the driving score may also be based on the level of compliance and/or the level of deviation between the observed driving behavior of the vehicle 120 and the expected driving behavior associated with each of the ignored traffic signs or violated traffic laws.

In some implementations, the driving score may be based on the detection of one or more dangerous driving attributes exhibited by the vehicle 120 during a certain time period or within a certain geographic area. As discussed, the dangerous driving attributes may include (but are not limited to) braking more than a number of instances, swerving within a lane, changing lanes more than a certain number of instances, crossing multiple lane boundaries, flashing headlights at another vehicle, tailgating another vehicle, driving the vehicle less than a certain distance from another vehicle, failure to use turn signals when turning or changing lanes, an inattentiveness of a human driver of the vehicle, etc.

In some other implementations, the driving score may be adjusted when one or more of the dangerous driving attributes previously exhibited by the vehicle 120 are no longer present or exhibited by the vehicle 120. For example, if a vehicle observed crossing a double-yellow line three times in the first several minutes of a 2-hour observation time period does not exhibit any dangerous driving attributes for the remainder of the time period, then one or more of the driving scores generated during those first few minutes of the time period may be adjusted (e.g., improved) to reflect the absence of dangerous driving attributes during the remainder of the time period. In addition, or in the alternative, one or more aspects of generating the driving scores or metrics may be performed by executing the driving score program 412 using the one or more processors 410.

In various implementations, the driving score engine 466 may determine more than one driving score for a respective vehicle 120. That is, in some implementations, the driving score engine 466 may determine a driving score for each of a plurality of different driving attributes or categories. For example, the driving score engine 466 may determine driving scores for driving attributes such as (but not limited to) traffic law violations, traffic sign violations, excessive speeds, vehicle lane management, driver attentiveness, frequent braking, tailgating, swerving, or insufficient distances maintained from other vehicles. In some instances, the driving score engine 466 may assign a weighting value to each of the individual driving scores, and determine an overall driving score for the vehicle based on the weighted individual driving scores. The driving score engine 466 may determine the relative impact of each individual driving score on the overall driving score by selecting and/or adjusting the weighting values assigned to the individual driving scores. In this way, the driving score engine 466 may place greater emphasis on some driving scores (e.g., excessive speeding) than on other driving scores (e.g., frequent braking).

In some implementations, each of the individual driving scores may have a corresponding unsafe driving threshold that, if exceeded, may result in a determination of unsatisfactory driving irrespective of the other individual driving scores. For example, if a vehicle's speed limit score exceeds a corresponding unsafe threshold (e.g., indicating that the vehicle was traveling at excessive or reckless speeds), the detection system 400 may generate an indication of unsafe or unsatisfactory driving even though other individual driving scores of the vehicle are excellent (e.g., despite the vehicle having excellent driver attentiveness scores). For another example, if a vehicle's traffic sign violation score exceeds a corresponding unsafe threshold (e.g., indicating that the vehicle frequently ran stop signs), the detection system 400 may generate an indication of unsafe or unsatisfactory driving even though other individual driving scores of the vehicle are excellent. The detection system 400 may send notifications to one or more interested third-parties in response to the indication of unsafe or unsatisfactory driving. In other implementations, the driving score engine 466 may use a single threshold for all individual driving scores of the vehicle.

In one implementation, the detection system 400 may receive a first indication of a first speed of the vehicle 120 at a first location and/or during a first portion of a given time period from one or more first devices. The detection system 400 may receive a second indication of a second speed of the vehicle 120 at a second location and/or during a second portion of the given time period from the first devices or from one or more second devices different than the first devices. The first and second devices may be any suitable device capable of determining a velocity of the vehicle 120, and may include (but not limited to) the road-side sensors 140, the RSUs 150, the other vehicles 160, or the mobile computing devices 190. In some implementations, the driving score engine 466 may determine whether the vehicle 120 exceeded a speed limit by more than an amount or exceeded the speed limit for more than a duration of time based on the first and second indications. In other implementations, the driving score program 412 may be executed by the processors 410 to determine whether the vehicle 120 exceeded the speed limit by more than the amount or exceeded the speed limit for more than the duration of time based on the first and second indications. In some instances, the detection system 400 may generate the driving scores based at least in part on determining that the vehicle 120 exceeded the speed limit by more than the amount (such as by 5 or 10 mph) or exceeded the speed limit for more than the duration of time (such for 5 or 10 minutes).

In various implementations, the probability modeling engine 468 may determine a likelihood of the vehicle 120 being involved in a vehicular accident based on the observed driving behavior. The probability modeling engine 468 may also determine a likelihood of injury to occupants of the vehicle 120 or to occupants of one or more other vehicles 160 based on the observed driving behavior of the vehicle 120. In some implementations, the probability modeling engine 468 may employ a trained machine learning model to determine the likelihood of the vehicle 120 being involved in a vehicular accident, to determine the likelihood of the vehicle 120 causing injury to occupants of the vehicle 120, and to determine the likelihood of the vehicle 120 causing injury to occupants of one or more other vehicles. In some instances, the machine learning model may be trained with one or more data sets including or indicating correlations between various driving behaviors and/or driving attributes and probabilities of being involved in a vehicular accident or causing bodily injury to occupants of one or more vehicles.

In some other implementations, the probability modeling engine 468 may determine a likelihood of the vehicle 120 causing an accident, inflicting bodily injury, causing damage to the vehicle 120, or other undesired behavior within a relatively short period of time (e.g., within the next 20 minutes, 40 minutes, and so on) or within a relatively short distance (e.g., within the next 15 miles, 25 miles, and so on).

In some instances, the probability modeling engine 468 may determine a likelihood of causing an accident, inflicting bodily injury, causing damage to the vehicle 120, or other undesired behavior over a relatively long period of time (e.g., within the next week or month). For example, in some aspects, the probability modeling engine 468 may determine that consistently engaging in a certain driving behavior increases the likelihood of the vehicle being involved in an accident by 50% each year.

In various implementations, the one or more processors 410 may execute the indications program 414 to generate an indication of unsatisfactory driving based on a comparison between the driving score provided by the driving score engine 466 (or the driving score program 412) and a threshold value. For example, the indications program 414 may generate the indication of unsatisfactory driving when the driving score is greater than the threshold value, and may not generate the indication of unsatisfactory driving when the driving score is not greater than the threshold value. In some instances, the indications program 414 may generate the indication of unsatisfactory driving only if the number of identified occurrences during the time period exceeds a threshold number. In some instances, the indications program 414 may generate the indication of unsatisfactory driving only if the number of identified occurrences exceeds a threshold number and stays above that threshold number (or a second threshold number, which may be lower than the threshold number) for a certain amount of time or a certain distance traveled.

In some implementations, the detection system 400 may provide the indication of unsatisfactory driving to one or more of the third-party entities 170. As discussed, the one or more third-party entities may include (but are not limited to) a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the detection system 400 may limit one or more operations of the vehicle in response to determining that the at least one driving score exceeds the threshold value. The one or more operations may be selected to incentivize the vehicle (or its human driver) to improve its driving behavior, and thus improve its driving score, by exhibiting a safer driving behavior, obeying traffic signs, and complying with traffic laws. In some implementations, the one or more operations may include (but are not limited to) limiting a top speed of the vehicle, limiting the vehicle to a speed within a certain amount or percentage over a posted speed limit, prohibiting the vehicle from using HOV lanes or toll lanes, precluding membership in a platoon, revoking membership in a platoon, disabling or restricting one or more features of a manual driving mode of the vehicle, disabling or restricting one or more features of an autonomous driving mode of the vehicle, or any combination thereof.

In some instances, the one or more operations may also include disabling or limiting one or more features of an infotainment system of the vehicle. For example, the detection system 400 may limit a volume level of the infotainment system, may limit an amount of time the infotainment system can be used, may limit the number of radio or satellite stations available on the infotainment system, may restrict the infotainment system to presenting good driving tips, may reduce the wireless range of the infotainment system, may increase or decrease one or more functionalities of the infotainment system based on the vehicle's current driving behavior, or any combination thereof.

In some other implementations, the one or more operations may reinforce safe driving practices such as (but not limited to) requiring that the vehicle travels in the slower lanes (e.g., right lanes) of a highway, that the vehicle maintains a certain distance (or more) from other vehicles, that the vehicle refrains from passing other vehicles, that the vehicle travels only within certain areas, that the vehicle travels only along certain routes, or any combination thereof. For example, in some instances, a vehicle having an unsatisfactory driving score may be limited to travel between home and one or more selected locations such as (but not limited to) school, doctors, dentists, or grocery stores. In other instances, a vehicle having an unsatisfactory driving score may be allowed to travel only on surface streets and two-lane roadways and/or may be precluded from travel along roads having more than a certain number of lanes or roads having speed limits higher than a certain speed. In some other instances, a vehicle having an unsatisfactory driving score may be disabled for a period of time after arriving at a destination (such as returning home safely).

In some implementations, the detection system 400 may alert other vehicles and pedestrians of the vehicle's potential safety risk. For example, in some instances, the one or more operations may include (but are not limited to) activating visual indicators (such as the vehicle's hazard lights) and/or audible indicators to alert other drivers of the vehicle's potential safety risk. In some other instances, the one or more operations may include instructing other vehicles to stay away from the vehicle or to increase their respective distances from the vehicle.

In various implementations, the detection system 400 may scrutinize the driving behavior of vehicles determined to pose a certain risk more closely than other vehicles determined to pose minimal risk. In some implementations, the detection system 400 may announce the presence of a respective vehicle within a certain environment, and provide various sensing and data collecting devices within the environment with information indicating the limits and restrictions placed on the respective vehicle. For example, the detection system 400 may inform one or more road-side sensors 140 or RSUs 150 within an area that the respective vehicle is limited to a top speed of 50 mph and is not permitted to use Interstate highways. In this way, if data received from the road-side sensors 140 or RSUs 150 captures the respective vehicle traveling on an Interstate highway or indicates that the respective vehicle is exceeding 50 mph, the detection system 400 may readily determine that the vehicle is not complying with the limitations and restrictions placed on the vehicle. The detection system 400 may further limit or disable various operations and features of the vehicle when the vehicle does not comply with existing limits and restrictions.

In one implementation, an entity associated with a human driver of a vehicle having an unsatisfactory driving score may participate in selecting the limits and restrictions placed on the vehicle (or its human driver). For example, if a teenager is determined to exhibit unsatisfactory driving behavior, the detection system 400 may notify the teenager's parents of the unsatisfactory driving behavior and solicit suggestions regarding which operations or features of the vehicle should be disabled, which operations or features of the vehicle should be restricted or limited, and which operations or features of the vehicle should be maintained in their current states.

The limits and restrictions placed on the vehicle can be maintained for any suitable period of time. In some instances, the limits and restrictions can be maintained for a fixed period of time (such as one week). In other instances, the limits and restrictions can be maintained for a smaller period of time (such as 3 days), and thereafter lifted when the driving score improves by a certain amount or percentage. In some other instances, the limits and restrictions may remain in place until released by the teenager's parents (or some other interested third-party).

The limits and restrictions placed on the vehicle may be lifted gradually or immediately. For example, in some instances, the detection system 400 may gradually increase a vehicle's top speed in conjunction with increases in the vehicle's driving score. In other instances, the detection system 400 may immediately allow the vehicle to travel in the HOV lane when the driving score improves by an amount or percentage. In some implementations, adjustments to the limits and restrictions placed on the vehicle may vary in proportion to the driving score. For example, a driving score less than a first value may result in permitting the vehicle to drive 10 mph or less over the posted speed limit, a driving score less than a second value may result in permitting the vehicle to drive 5 mph or less over the posted speed limit, and a driving score less than a third value may result in precluding the vehicle from exceeding the speed limit, where the third value is less than the second value, and the second value is less than the first value.

In some implementations, the one or more processors 410 may execute the reporting program 416 to generate a report indicating the number of identified occurrences of each dangerous driving attribute exhibited by the vehicle 120 during a certain time period and/or within a certain geographic area. In some instances, the detection system 400 may provide the report to one or more of the third-party entities 170.

The machine learning engines 460 as described herein may be performed by a wide variety of methods or combinations of methods including (but not limited to) supervised learning, unsupervised learning, temporal difference learning, or reinforcement learning. Some non-limiting examples of supervised learning that can be used in accordance with various aspects of the present disclosure include artificial neural networks, Bayesian networks, decision trees, Gaussian process regression, nearest neighbor algorithm, support vector machines, random forests, and hidden Markov models. Some non-limiting examples of unsupervised learning that can be used in accordance with various aspects of the present disclosure include neural networks, data clustering, vector quantization, and hierarchical clustering. Some non-limiting example of temporal difference learning that can be used in accordance with various aspects of the present disclosure include Q-learning and learning automata. Specific details regarding any of the examples of supervised, unsupervised, temporal difference or other machine learning described herein are known and are within the scope of this disclosure.

The data store 470, which may be coupled to the memory 420 and the machine learning engines 460, may be any suitable memory or storage device suitable for storing information or data associated with determining whether an observed driving behavior of the vehicle 120 is unsafe or unsatisfactory. In various implementations, the data store 470 may store navigation data, detailed mapping data (such as street views, satellite views, and 3D point clouds) of one or more geographic areas, information indicating the types and locations of traffic signs and traffic signals in the one or more geographic areas, information indicating the types and locations of road-side sensors 140 and RSUs 150 in the one or more geographic areas, speed limit information of roads and streets within the one or more geographic areas, and so on.

In some implementations, the data store 470 may also store weather information, user profiles, safety information, driving scores, and other information pertaining to the vehicle 120, the surrounding environment, and/or occupants of the vehicle 120. In some aspects, the data store 470 may also store training data for one or more of the machine learning engines 460.

Figure 5A:
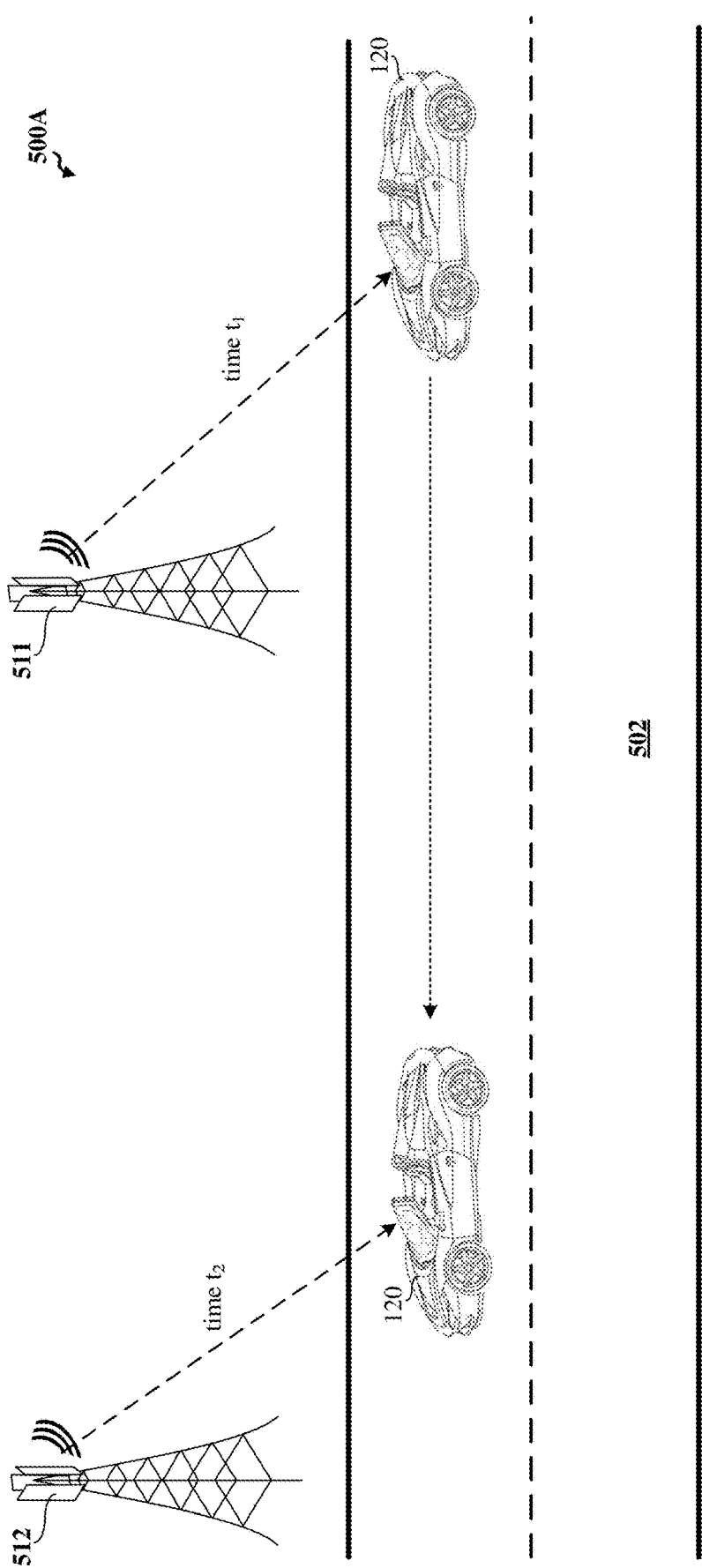
FIG. 5A shows an illustration depicting an example operation for determining a speed or velocity of a vehicle, according to some implementations.

FIG. 5A shows an illustration 500A depicting an example operation for determining a speed or velocity of a vehicle, according to some implementations. In various implementations, the operation may be performed by one or more components of the detection system 400 of FIG. 4. As shown in FIG. 5A, the vehicle 120 is driving along a road 502. A first RADAR device 511 (which may be an example of a road-side sensor 140 and/or RSU 150) is positioned at a first location along the road 502, and a second RADAR device 512 is positioned at a second location along the road 502. As the vehicle 120 approaches the first RADAR device 511, the first RADAR device 511 determines a first speed of the vehicle 120 at a first time $t_1$. Then, as the vehicle 120 approaches the second RADAR device 512, the second RADAR device 512 determines a second speed of the vehicle 120 at a second time $t_2$. The first RADAR device 511 may send the first speed of the vehicle 120 to the detection system 400. The second RADAR device 512 may send the second speed of the vehicle 120 to the detection system 400. The detection system 400 may determine whether the vehicle 120 exceeded a speed limit applicable to the road 502 by more than an amount and/or for more than a duration of time based on the first and second detected speeds.

Figure 5B:
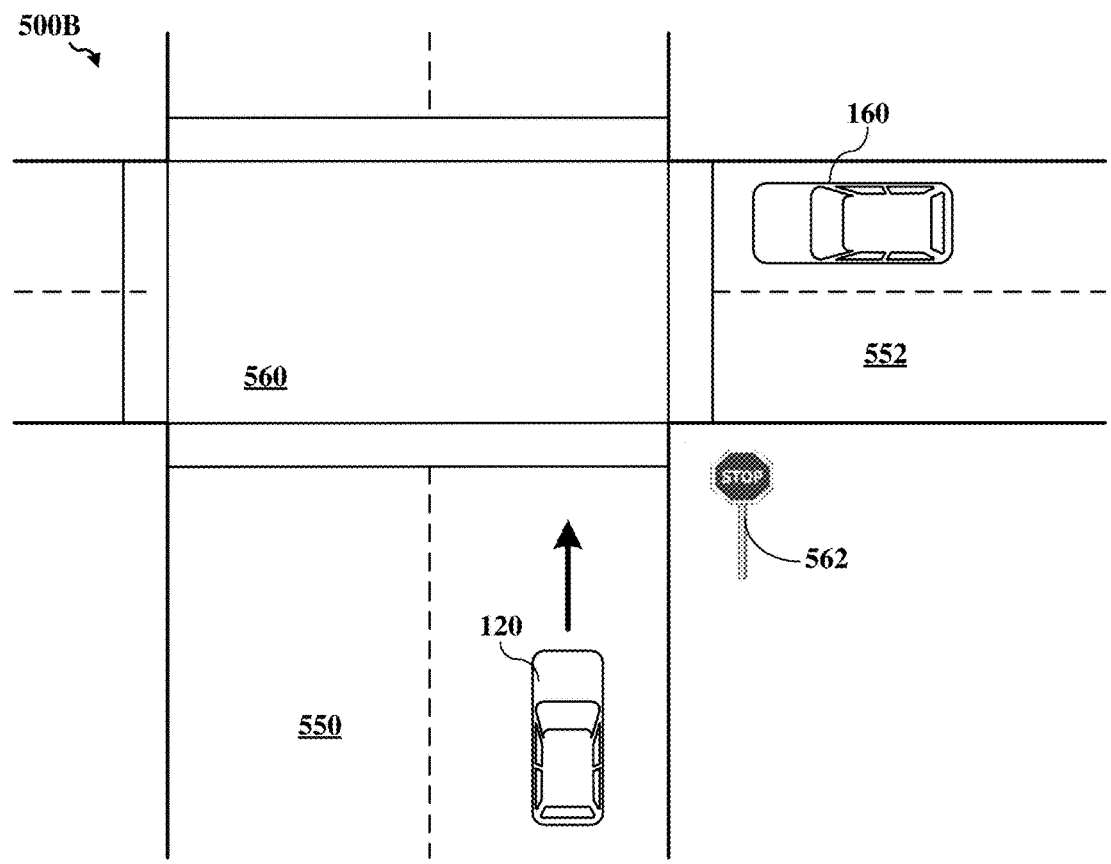
FIG. 5B and FIG. 5C show illustrations depicting an example operation for determining whether a vehicle ignored a stop sign, according to some implementations.
Figure 5C:
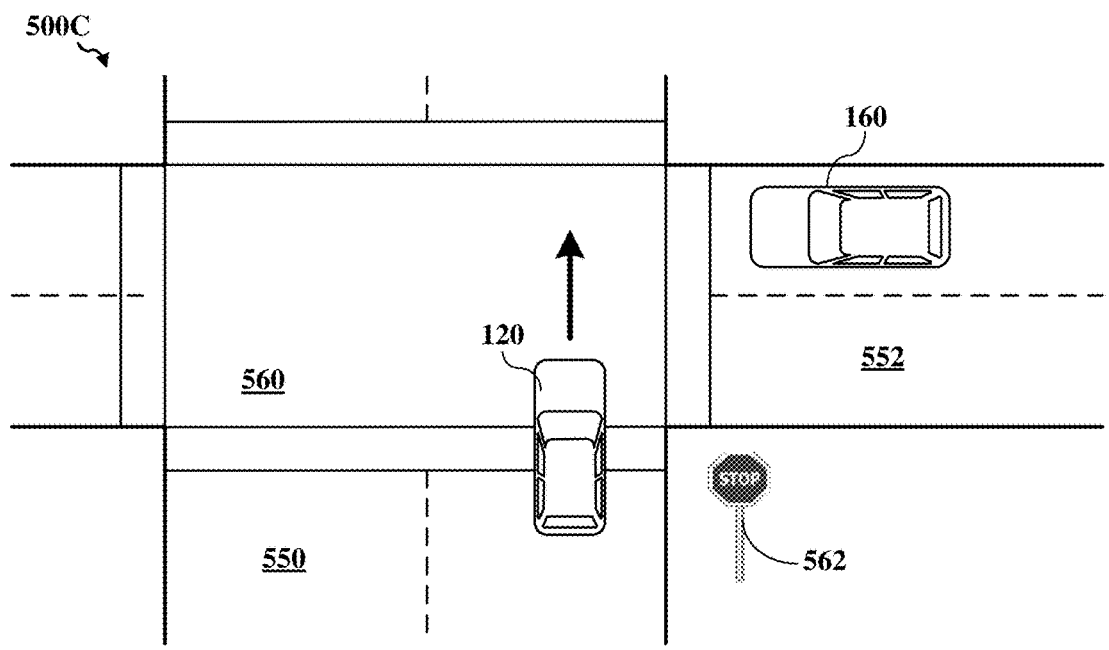

FIGS. 5B and 5C show respective illustrations 500B and 500C depicting an example operation for determining whether the vehicle 120 ran a stop sign, according to some implementations. In various implementations, the operation may be performed by one or more components of the detection system 400 of FIG. 4. As shown in FIG. 5B, the vehicle 120 is driving along a road 550 approaching an intersection 560 with another road 552. Another vehicle 160 is stopped at the intersection 560, which includes four-way stop signs 562 (only one stop sign 562 shown for simplicity). In some implementations, the object detection and classification engine 462 may identify and classify the stop sign 562. In other implementations, the vehicle 120 (or other entity, such as the other vehicle 160) may identify the stop sign 562 in any suitable manner, such as via a detailed map (e.g., a high-definition map). In response thereto, the driving behavior engine 464 may determine an expected driving behavior corresponding to stop signs.

A short time later, the vehicle 120 travels through the intersection 560 without stopping at the stop sign 562, as depicted in FIG. 5C. The driving behavior engine 464 may receive data indicative of the driving behavior of the vehicle 120 captured by one or more sensors associated with the other vehicle 160 and/or captured by one or more mobile computing devices 190 associated with one or more occupants of the other vehicle 160. In some instances, a computer vision of the other vehicle may provide data indicative of the driving behavior of the vehicle 120. In other instances, images and/or video indicative of the driving behavior of the vehicle 120 may be captured by the one or more mobile computing devices 190 and provided to the detection system 400.

The driving behavior engine 464 may compare the observed driving behavior of the vehicle 120 with the expected driving behavior associated with a stop sign. In this example, the driving behavior engine 464 may determine that the vehicle 120 ignored the stop sign 562 based on a mismatch between the observed driving behavior of the vehicle 120 (did not stop at the stop sign 562) with the expected driving behavior associated with the stop sign (stop at the stop sign 562). In some instances, the mismatch may be indicated by a correlation between the observed driving behavior of the vehicle 120 and the expected driving behavior being less than a certain correlation value. In other instances, the mismatch may be indicated by a deviation between the observed driving behavior of the vehicle 120 and the expected driving behavior being greater than a certain deviation value.

In some implementations, the driving behavior engine 464 may determine the extent to which a respective vehicle violated or ignored a particular traffic sign or traffic law. For example, in some instances, the driving behavior engine 464 may determine whether the respective vehicle merely rolled through a stop sign at a relatively low speed (such as 2-3 mph), or whether the respective vehicle made no attempt to slow down but instead drove through the stop sign at 45 mph. Since rolling through the stop sign at 2 or 3 mph is not nearly as egregious (and poses a significantly lower risk of accident or injury) than barreling through the stop sign at 45 mph, the driving detection system may determine a driving score based on the severity or recklessness of the stop sign violation. In this example, the driving score of the respective vehicle may be adversely affected in an amount proportional to the respective vehicle's speed through the stop sign.

Figure 6:
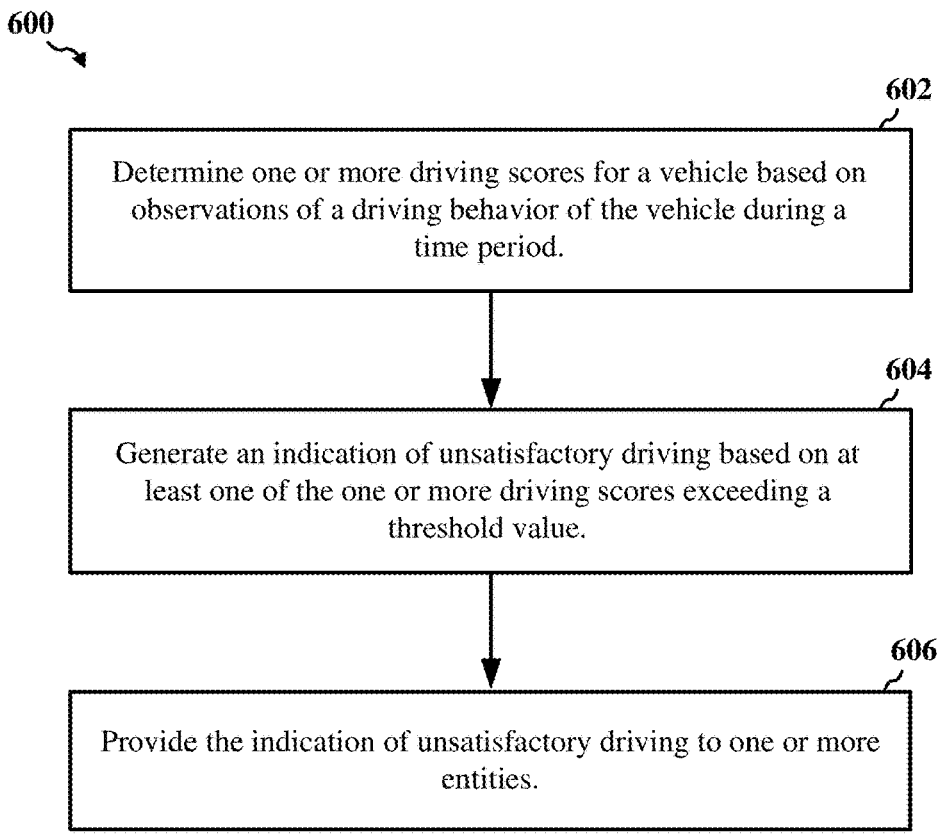
FIG. 6 shows a flow chart depicting an example operation for determining one or more driving characteristics of a vehicle, according to some implementations.

FIG. 6 shows a flow chart depicting an example operation 600 for determining one or more driving characteristics of a vehicle, according to some implementations. In various implementations, the operation 600 may be performed by the driving detection system 400 of FIG. 4. At block 602, the system may determine one or more driving scores for the vehicle based on observations of a driving behavior of the vehicle during a time period. At block 604, the system may generate an indication of unsatisfactory driving based on at least one of the one or more driving scores exceeding a threshold value. At block 606, the system may provide the indication of unsatisfactory driving to one or more entities. In some implementations, the indication of unsatisfactory driving may be generated only if the one or more driving scores exceed the threshold value for more than a portion or percentage of the time period.

The vehicle may be any suitable type of vehicle. For example, in some implementations, the vehicle may be an autonomous vehicle, a semi-autonomous vehicle, an autonomous vehicle configured for passenger service, or a vehicle operated by a human driver and equipped with an advanced driver assistance system (ADAS). In some implementations, the one or more entities may include (but are not limited to) at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

In various implementations, the observations may be received from one or more devices via a physical downlink shared channel (PDSCH) of a Fifth Generation New Radio (5G NR) system, a vehicle-to-everything (V2X) channel of the 5G NR system, a vehicle-to-infrastructure (V2I) channel of the 5G NR system, a Fourth Generation Radio Access Network (4G RAN), an unlicensed frequency band, a peerto-peer (P2P) communication link, a dedicated short range communication (DSRC) channel, a wireless local area network (WLAN), or any combination thereof. In some implementations, the one or more devices may include (but are not limited to) at least one of road-side sensors 140, road-side units 150, sensors, computer vision systems of one or more other vehicles 160, LIDAR devices, RADAR devices, mobile computing devices 190 of one or more pedestrians 130, mobile computing devices 190 of occupants 162 of one or more other vehicles 160, a microphone associated with the vehicle, or any combination thereof.

Figure 7:
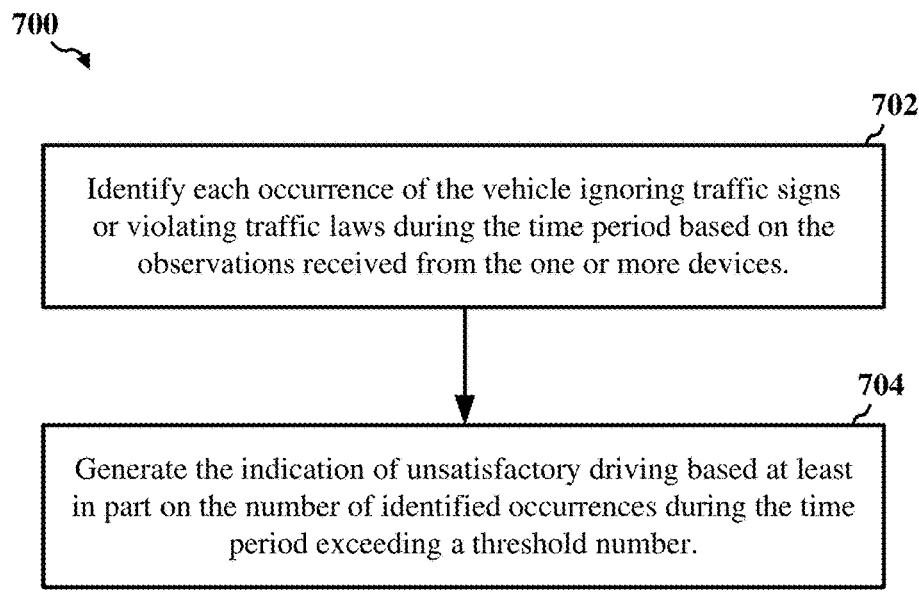
FIG. 7 shows a flow chart depicting another example operation for determining one or more driving characteristics of a vehicle, according to some implementations.

FIG. 7 shows a flowchart depicting another example operation 700 for determining one or more driving characteristics of a vehicle, according to some implementations. In various implementations, the operation 700 may be performed by the driving detection system 400 of FIG. 4. In some instances, the operation 700 may be performed in conjunction with generating the indication of unsatisfactory driving in block 604 of FIG. 6. For example, at block 702, the system may identify each occurrence of the vehicle ignoring traffic signs or violating traffic laws during the time period based on the observations received from the one or more devices. At block 704, the system may generate the indication of unsatisfactory driving based at least in part on the number of identified occurrences during the time period exceeding a threshold number.

Figure 8:
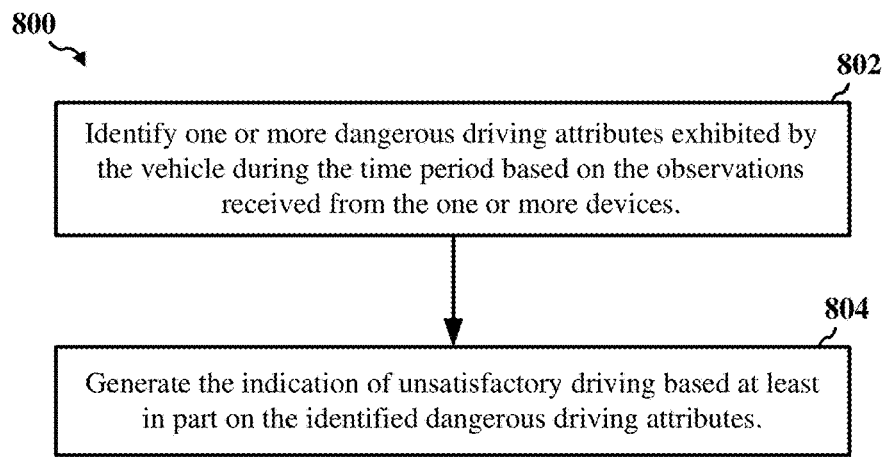
FIG. 8 shows a flow chart depicting another example operation for determining one or more driving characteristics of a vehicle, according to some implementations.

FIG. 8 shows a flowchart depicting another example operation 800 for determining one or more driving characteristics of a vehicle, according to some implementations. In various implementations, the operation 800 may be performed by the driving detection system 400 of FIG. 4. In some instances, the operation 800 may be performed in conjunction with generating the indication of unsatisfactory driving in block 604 of FIG. 6. For example, at block 802, the system may identify one or more dangerous driving attributes exhibited by the vehicle during the time period based on the observations received from the one or more devices. At block 804, the system may generate the indication of unsatisfactory driving based at least in part on the identified dangerous driving attributes.

In some implementations, the one or more dangerous driving attributes may include (but are not limited to) braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle. In some instances, the indication of unsatisfactory driving may be generated only if the one or more dangerous driving attributes identified during the time period exceeds a threshold number by more than an amount or percentage. The threshold number for each type of dangerous driving attribute may be set to any suitable value. In various implementations, different thresholds corresponding to different dangerous driving attributes may be set to different values. For example, in some instances, the system may not generate an indication of speeding unless the vehicle is more than a certain amount (such as 5 or 10 mph) over an applicable speed limit or more than a certain percentage (such as 10 or 15 percent) over the applicable speed limit.

In various implementations, one or more first devices may identify a first number of dangerous driving attributes exhibited by the vehicle at a first location and/or at a first time, and one or more second devices may identify a second number of dangerous driving attributes exhibited by the vehicle at a second location and/or at a second time. That is, in some aspects, the one or more first devices may be positioned at a location different than the one or more second devices. In some implementations, the second number of dangerous driving attributes may be analyzed based on the identification of the first number of dangerous driving attributes. For example, if the system identifies a number of respective dangerous driving attributes of the vehicle observed at the first location and/or the first time by the one or more first devices, the system may determine whether any of the respective dangerous driving attributes were also observed at the second location and/or at the second time by the one or more second devices.

In some implementations, one or more of the dangerous driving attributes of the vehicle may be continuously captured or provided by another vehicle. For example, in some instances, another vehicle equipped with sensors, computer vision, and/or passengers carrying mobile computing devices 190 may follow the vehicle for a particular distance or period of time during which images and/or video captured by the other vehicle can be transmitted to the system. The system may analyze or process the received images and/or video to determine whether the observed driving behavior of the vehicle exhibits one or more of the dangerous driving attributes.

Figure 9:
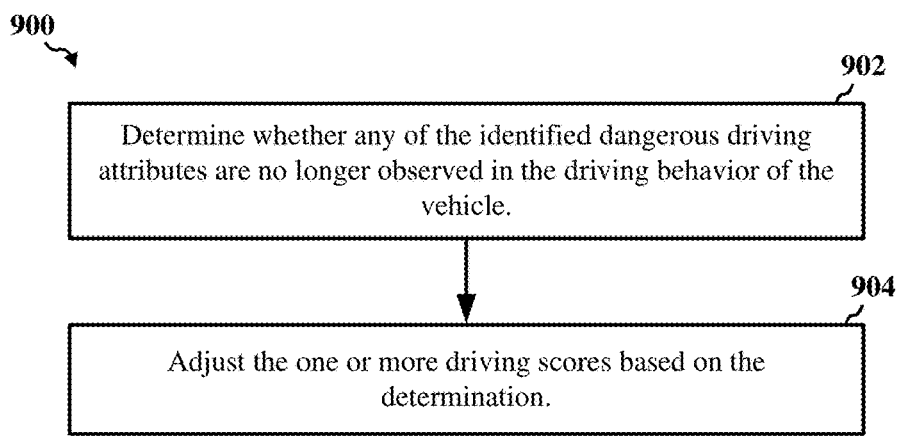
FIG. 9 shows a flowchart depicting an example operation for adjusting one or more driving scores of a vehicle, according to some implementations.

FIG. 9 shows a flowchart depicting an example operation 900 for adjusting one or more driving scores of a vehicle, according to some implementations. In various implementations, the operation 900 may be performed by the driving detection system 400 of FIG. 4. In some instances, the operation 900 may be performed after generating the indication of unsatisfactory driving in block 804 of FIG. 8. For example, at block 902, the system may determine whether any of the identified dangerous driving attributes are no longer observed in the driving behavior of the vehicle. At block 904, the system may adjust the one or more driving scores based on the determination.

Figure 10:
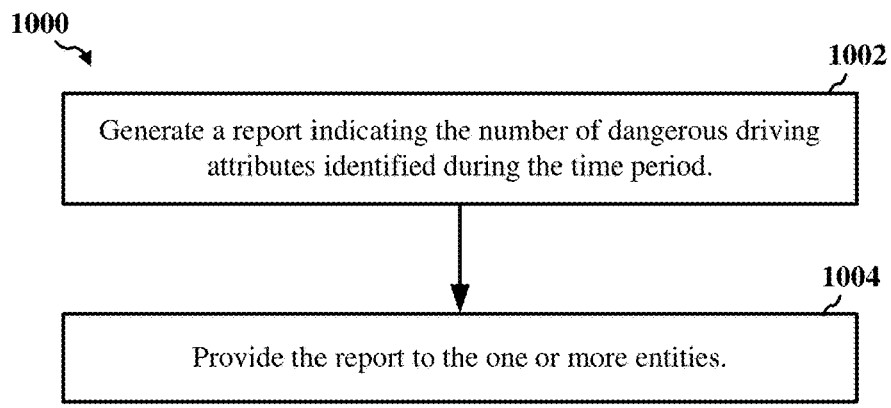
FIG. 10 shows a flow chart depicting an example operation for generating a report of unsatisfactory driving behavior of a vehicle, according to some implementations.

FIG. 10 shows a flowchart depicting an example operation 1000 for generating a report of unsatisfactory driving behavior of a vehicle, according to some implementations. In various implementations, the operation 1000 may be performed by the driving detection system 400 of FIG. 4. In some instances, the operation 1000 may be performed after generating the indication of unsatisfactory driving in block 804 of FIG. 8. At block 1002, the system may generate a report indicating the number of dangerous driving attributes identified during the time period. At block 1004, the system may provide the report to the one or more entities. As discussed, in some aspects, the one or more entities may include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

Figure 11:
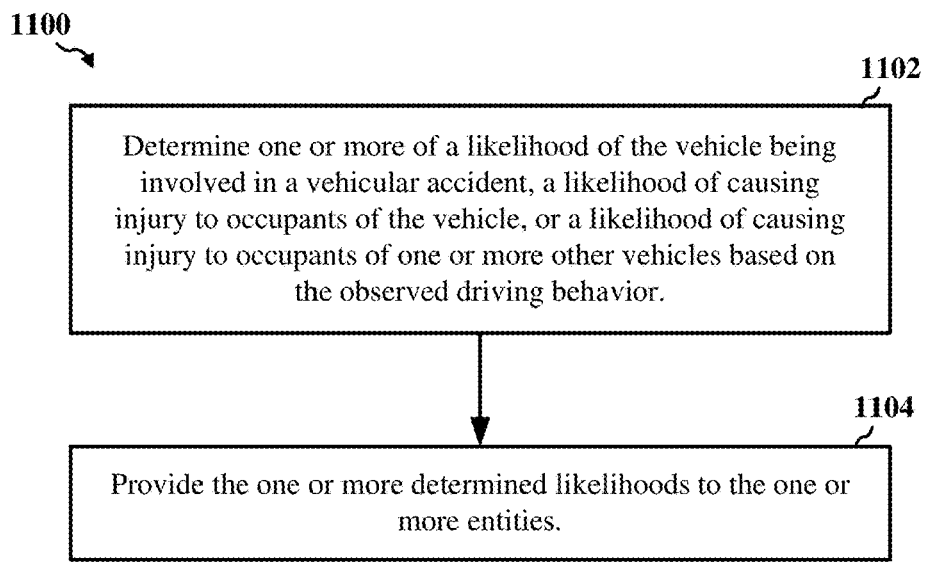
FIG. 11 shows a flow chart depicting an example operation for determining likelihoods of accidents or injuries caused by a vehicle, according to some implementations.

FIG. 11 shows a flowchart depicting an example operation 1100 for determining likelihoods of accidents or injuries caused by a vehicle, according to some implementations. In various implementations, the operation 1100 may be performed by the driving detection system 400 of FIG. 4. In some instances, the operation 1100 may be performed at any time before, during, or after the operation 600 of FIG. 6. For example, at block 1102, the system may determine a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations. At block 1102, the system may provide the determined likelihood to the one or more entities. As discussed, in some aspects, the one or more entities may include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

Figure 12:
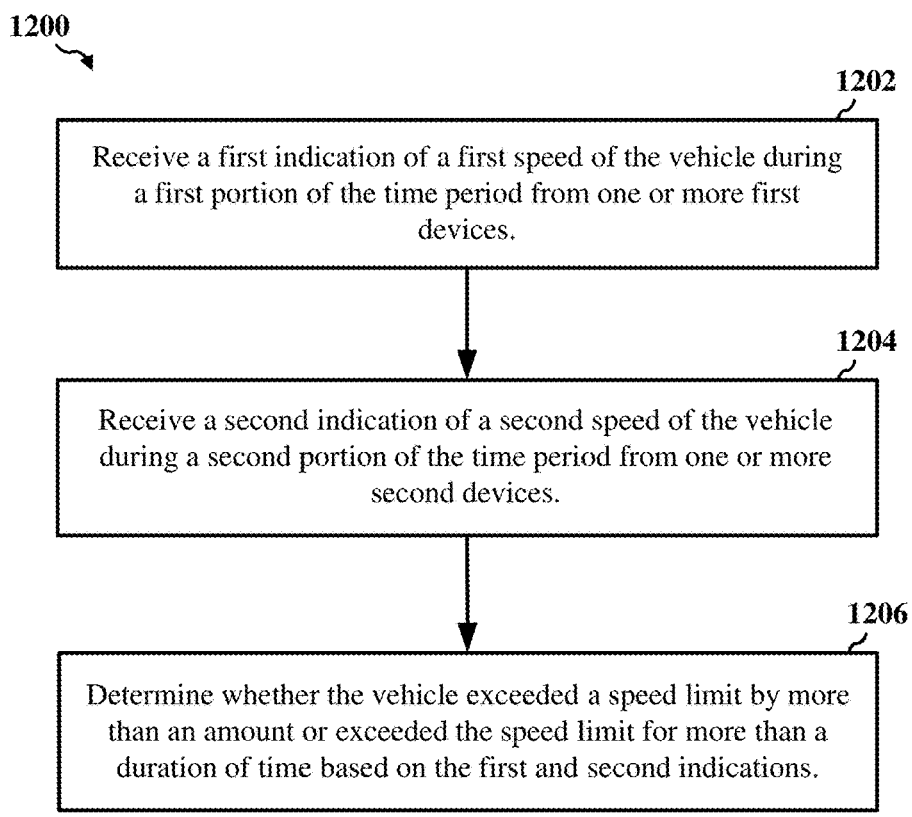
FIG. 12 shows a flow chart depicting an example operation for determining whether a vehicle exceeded a speed limit, according to some implementations.

FIG. 12 shows a flowchart depicting an example operation 1200 for determining whether a vehicle exceeded a speed limit, according to some implementations. In various implementations, the operation 1200 may be performed by the driving detection system 400 of FIG. 4. In some instances, the operation 1200 may be performed at any suitable time prior to providing the indication of unsatisfactory driving in block 606 of FIG. 6. For example, at block 1202, the system may receive a first indication of a first speed of the vehicle during a first portion of the time period from one or more first devices. At block 1204, the system may receive a second indication of a second speed of the vehicle during a second portion of the time period from one or more second devices. At block 1206, the system may determine whether the vehicle exceeded a speed limit by more than an amount or exceeded the speed limit for more than a duration of time based on the first and second indications.

In various implementations, the first indication may be captured or provided by one or more first devices, and the second indication may be captured or provided by one or more second devices. In some implementations, the one or more first devices may be positioned at a location different than the one or more second device. In some instances, the one or more first devices may be the same or similar devices as the one or more second devices. In some other instances, the one or more first devices may be different devices than the one or more second devices.

In some implementations, one or more of the first indication or the second indication may be captured or provided by another vehicle. For example, in some instances, another vehicle equipped with sensors, computer vision, and/or passengers carrying mobile computing devices 190 may follow the vehicle for a particular distance or period of time during which images and/or video captured by the other vehicle can be transmitted to the driving detection system 110. The driving detection system 110 may analyze or process the received images and/or video to determine whether the vehicle exceeded a speed limit by more than an amount or exceeded the speed limit for more than a duration of time based on the first and second indications. In some other implementations, the first indication may be captured or provided by one or more first road-side sensors or RSUs proximate to a first location, and the second indication may be captured or provided by one or more second road-side sensors or RSUs proximate to a second location different than the first location. The first and second indications may be transmitted to the detection system 110, which may analyze or process the indications to determine whether the vehicle exceeded a speed limit by more than an amount or exceeded the speed limit for more than a duration of time.

Figure 13:
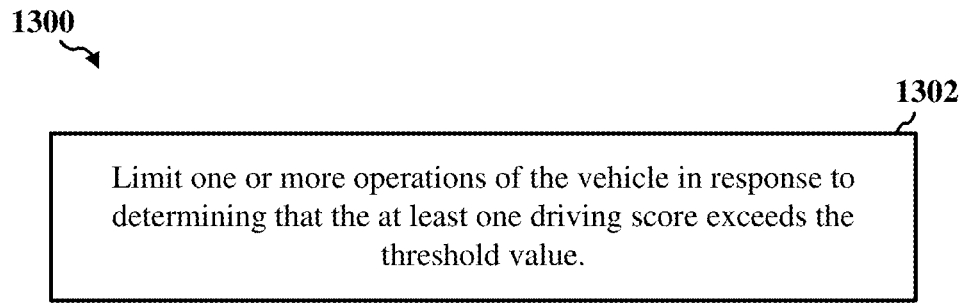
FIG. 13 shows a flow chart depicting an example operation for taking corrective actions associated with a vehicle, according to some implementations.

FIG. 13 shows a flow chart depicting an example operation 1300 for taking corrective actions associated with a vehicle, according to some implementations. In various implementations, the operation 1300 may be performed by the driving detection system 400 of FIG. 4. In some instances, the operation 1300 may be performed at any suitable time during the operation 600 of FIG. 6. In some other instances, the operation 1300 may be performed after the operation 600 of FIG. 6. For example, at block 1302, the system may limit one or more operations of the vehicle in response to determining that the at least one driving score exceeds the threshold value.

In various implementations, the one or more operations may include limiting a speed of the vehicle or limiting the vehicle to a speed within a certain amount or percentage over a posted speed limit, disabling or limiting one or more features of an infotainment system of the vehicle, disabling or restricting one or more features of a manual driving mode of the vehicle, disabling or restricting one or more features of an autonomous driving mode of the vehicle, restricting travel of the vehicle to certain areas or along certain routes, requiring the vehicle to increase spacings between the vehicle and other vehicles, disabling the vehicle for period of time after the vehicle arrives at a destination, or any combination thereof.

Figure 14:
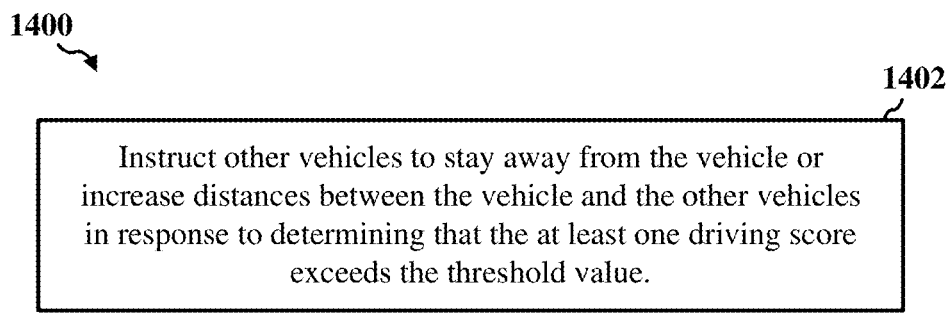
FIG. 14 shows a flow chart depicting an example operation for taking corrective actions associated with a vehicle, according to other implementations.

FIG. 14 shows a flow chart depicting another example operation 1400 for taking corrective actions associated with a vehicle, according to some implementations. In various implementations, the operation 1400 may be performed by the driving detection system 400 of FIG. 4. In some instances, the operation 1400 may be performed at any suitable time during the operation 600 of FIG. 6. In some other instances, the operation 1400 may be performed after the operation 600 of FIG. 6. For example, at block 1402, the system may instruct other vehicles to stay away from the vehicle or to increase distances between the vehicle and the other vehicles in response to determining that the at least one driving score exceeds the threshold value.

Figure 15:
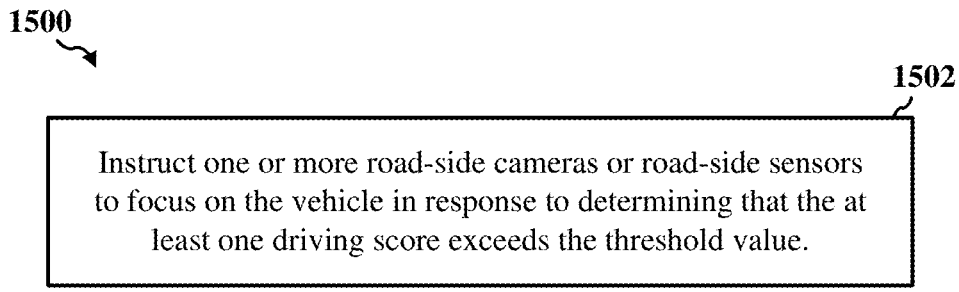
FIG. 15 shows a flow chart depicting an example operation for taking corrective actions associated with a vehicle, according to some other implementations.

FIG. 15 shows a flow chart depicting another example operation 1500 for taking corrective actions associated with a vehicle, according to some implementations. In various implementations, the operation 1500 may be performed by the driving detection system 400 of FIG. 4. In some instances, the operation 1500 may be performed at any suitable time during the operation 600 of FIG. 6. In some other instances, the operation 1500 may be performed after the operation 600 of FIG. 6. For example, at block 1502, the system may instruct one or more road-side cameras or road-side sensors to focus on the vehicle in response to determining that the at least one driving score exceeds the threshold value.

Implementation examples are described in the following numbered clauses:

1. A system including:
   one or more transceivers; and
   one or more processors coupled to the one or more transceivers, the one or more processors operably configured to:
      determine one or more driving scores for a vehicle based on observations of a driving behavior of the vehicle during a time period;
      generate an indication of unsatisfactory driving based on at least one of the one or more driving scores exceeding a threshold value; and
      provide the indication of unsatisfactory driving to one or more entities.
2. The system of clause 1, where the vehicle includes an autonomous vehicle, a semi-autonomous vehicle, an autonomous vehicle configured for passenger service, or a vehicle operated by a human driver and equipped with an advanced driver assistance system (ADAS).
3. The system of any one or more of clauses 1-2, where the one or more entities include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

4. The system of any one or more of clauses 1-3, where the indication of unsatisfactory driving is generated only if the one or more driving scores exceed the threshold value for more than a portion or percentage of the time period.

5. The system of any one or more of clauses 1-4, where the one or more transceivers are configured to receive the observations from one or more devices via a physical downlink shared channel (PDSCH) of a Fifth Generation New Radio (5G NR) system, a vehicle-to-everything (V2X) channel of the 5G NR system, a vehicle-to-infrastructure (V2I) channel of the 5G NR system, a Fourth Generation Radio Access Network (4G RAN), an unlicensed frequency band, a peer-to-peer (P2P) communication link, a dedicated short range communication (DSRC) channel, a wireless local area network (WLAN), or any combination thereof.

6. The system of clause 5, where the one or more devices include at least one of road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

7. The system of clause 5, where the one or more processors are further operably configured to:
identify each occurrence of the vehicle ignoring traffic signs or violating traffic laws during the time period based on the observations received from the one or more devices; and
generate the indication of unsatisfactory driving based at least in part on the number of identified occurrences during the time period exceeding a threshold number.

8. The system of clause 5, where the one or more processors are further operably configured to:
identify one or more dangerous driving attributes exhibited by the vehicle during the time period based on the observations received from the one or more devices; and
generate the indication of unsatisfactory driving based at least in part on the identified dangerous driving attributes.

9. The system of clause 8, where the indication of unsatisfactory driving is generated only if the number of dangerous driving attributes identified during the time period exceeds a threshold number by more than an amount or percentage.

10. The system of any one or more of clauses 8-9, where the one or more dangerous driving attributes includes at least one of braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

11. The system of clause 8, where the one or more processors are further operably configured to:
determine whether any of the identified dangerous driving attributes are no longer observed in the driving behavior of the vehicle; and
adjust the one or more driving scores based on the determination.

12. The system of clause 8, where the one or more processors are further operably configured to:
generate a report indicating the number of dangerous driving attributes identified during the time period; and
provide the report to the one or more entities.

13. The system of any one or more of clauses 1-12, where the one or more processors are further operably configured to:
receive a first indication of a first speed of the vehicle during a first portion of the time period from one or more first devices;
receive a second indication of a second speed of the vehicle during a second portion of the time period from one or more second devices; and
determine whether the vehicle exceeded a speed limit by more than an amount or exceeded the speed limit for more than a duration of time based on the first and second indications.

14. The system of clause 13, where generation of the indication of unsatisfactory driving is based at least in part on a determination that the vehicle exceeded the speed limit by more than the amount or exceeded the speed limit for more than the duration of time.

15. The system of any one or more of clauses 1-14, where the one or more processors are further operably configured to:
determine a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations; and
provide the determined likelihood to the one or more entities.

16. A method of determining one or more driving characteristics of a vehicle, including:
determining one or more driving scores for a vehicle based on observations of a driving behavior of the vehicle during a time period;
generating an indication of unsatisfactory driving based on at least one of the one or more driving scores exceeding a threshold value; and
providing the indication of unsatisfactory driving to one or more entities.

17. The method of clause 16, where the vehicle is one of an autonomous vehicle, a semi-autonomous vehicle, an autonomous vehicle configured for passenger service, or a vehicle operated by a human driver and equipped with an advanced driver assistance system (ADAS).

18. The method of any one or more of clauses 16-17, where the one or more entities include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

19. The method of any one or more of clauses 16-18, where the indication of unsatisfactory driving is generated only if the one or more driving scores exceed the threshold value for more than a portion or percentage of the time period.

20. The method of any one or more of clauses 16-19, where the observations are received from one or more devices including at least one of road-side cameras, road-side sensors, computer vision systems of one or more other vehicles, LIDAR devices, RADAR devices, mobile computing devices of one or more pedestrians, mobile computing devices of occupants of one or more other vehicles, a microphone associated with the vehicle, or any combination thereof.

21. The method of clause 20, where the method further includes:

identifying each occurrence of the vehicle ignoring traffic signs or violating traffic laws during the time period based on the observations received from the one or more devices; and generating the indication of unsatisfactory driving based at least in part on the number of identified occurrences during the time period exceeding a threshold number.

22. The method of clause 20, where the method further includes:

identifying one or more dangerous driving attributes exhibited by the vehicle during the time period based on the observations received from the one or more devices; and generating the indication of unsatisfactory driving based at least in part on the identified dangerous driving attributes.

23. The method of clause 22, where the indication of unsatisfactory driving is generated only if the number of dangerous driving attributes identified during the time period exceeds a threshold number by more than an amount or percentage.

24. The method of any one or more of clauses 22-23, where the one or more dangerous driving attributes includes at least one of braking more than a number of instances, swerving within a lane, changing lanes more than a second number of instances, crossing multiple lane boundaries, flashing headlights at another vehicle, tailgating another vehicle, driving the vehicle less than a distance from another vehicle, or an inattentiveness of a human driver of the vehicle.

25. The method of clause 22, where the method further includes:

determining whether any of the identified dangerous driving attributes are no longer observed in the driving behavior of the vehicle; and adjusting the one or more driving scores based on the determination.

26. The method of clause 25, where the method further includes:

generating a report indicating the number of dangerous driving attributes identified during the time period; and providing the report to the one or more entities.

27. The method of any one or more of clauses 16-26, where the method further includes:

receiving a first indication of a first speed of the vehicle during a first portion of the time period from one or more first devices;

receiving a second indication of a second speed of the vehicle during a second portion of the time period from one or more second devices; and determining whether the vehicle exceeded a speed limit by more than an amount or exceeded the speed limit for more than a duration of time based on the first and second indications.

28. The method of any one or more of clauses 16-27, where the method further includes:

determining a likelihood of the vehicle being involved in a vehicular accident, a likelihood of the vehicle causing injury to occupants of the vehicle, a likelihood of the vehicle causing injury to occupants of one or more other vehicles, or any combination thereof based on the received observations; and providing the determined likelihood to the one or more entities.

29. A system, including:

means for determining one or more driving scores for a vehicle based on observations of a driving behavior of the vehicle during a time period;

means for generating an indication of unsatisfactory driving based on at least one of the one or more driving scores exceeding a threshold value; and means for providing the indication of unsatisfactory driving to one or more entities.

30. A non-transitory computer-readable medium storing computer executable code that, when executed by one or more processors of a system, causes the system to perform operations including:

determining one or more driving scores for a vehicle based on observations of a driving behavior of the vehicle during a time period;

generating an indication of unsatisfactory driving based on at least one of the one or more driving scores exceeding a threshold value; and providing the indication of unsatisfactory driving to one or more entities.

31. The system of any one or more of clauses 1-15, where the one or more processors are further operably configured to:

limit one or more operations of the vehicle in response to determining that the at least one driving score exceeds the threshold value.

32. The system of clause 31, where the one or more operations include limiting a speed of the vehicle or limiting the vehicle to a speed within a certain amount or percentage over a posted speed limit.

33. The system of clause 32, where the one or more operations include disabling or limiting one or more features of an infotainment system of the vehicle.

34. The system of clause 32, where the one or more operations include disabling or restricting one or more features of a manual driving mode of the vehicle.

35. The system of clause 32, where the one or more operations include disabling or restricting one or more features of an autonomous driving mode of the vehicle.

36. The system of clause 32, where the one or more operations include restricting travel of the vehicle to certain areas or along certain routes.

37. The system of clause 32, where the one or more operations include requiring the vehicle to increase spacings between the vehicle and other vehicles.

38. The system of clause 32, where the one or more operations include disabling the vehicle for period of time after the vehicle arrives at a destination.

39. The system of any one or more of clauses 1-15, where the one or more processors are further operably configured to:

instruct other vehicles to stay away from the vehicle or increase distances between the vehicle and the other vehicles in response to determining that the at least one driving score exceeds the threshold value.

40. The system of any one or more of clauses 1-15, where the one or more processors are further operably configured to:

instruct one or more road-side cameras or road-side sensors to focus on the vehicle in response to determining that the at least one driving score exceeds the threshold value.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system comprising:
   one or more transceivers; and
   one or more processors coupled to the one or more transceivers, the one or more processors operably configured to:
   receive, via the one or more transceivers, observations of a driving behavior of a vehicle during a time period from one or more devices;
   determine driving scores for the vehicle based on the observations of the driving behavior of the vehicle during the time period, wherein each of the driving scores corresponds to a different dangerous driving attribute in a plurality of dangerous driving attributes;
   generate an indication of unsatisfactory driving based on a driving score in the driving scores exceeding a threshold value corresponding to one of the plurality of dangerous driving attributes and based on the driving score in the driving scores exceeding the threshold value for more than a portion of the time period, wherein the threshold value is included in threshold values corresponding to the plurality of dangerous driving attributes; and
   provide, via the one or more transceivers, the indication of the unsatisfactory driving to one or more entities.

2. The system of claim 1, wherein the vehicle comprises a first autonomous vehicle, a semi-autonomous vehicle, a second autonomous vehicle configured for passenger service, or a first vehicle operated by a human driver and equipped with an advanced driver assistance system (ADAS).

3. The system of claim 1, wherein the one or more entities include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

4. The system of claim 1, wherein to receive the observations from the one or more devices, the one or more processors are operably configured to receive the observations via a physical downlink shared channel (PDSCH) of a Fifth Generation New Radio (5G NR) system, a vehicle-to-everything (V2X) channel of the 5G NR system, a vehicle-to-infrastructure (V2I) channel of the 5G NR system, a Fourth Generation Radio Access Network (4G RAN), an unlicensed frequency band, a peer-to-peer (P2P) communication link, a dedicated short range communication (DSRC) channel, a wireless local area network (WLAN), or any combination thereof.

5. The system of claim 4, wherein the one or more devices include at least one of road-side cameras, road-side sensors, computer vision systems of one or more other vehicles, LIDAR devices, RADAR devices, first mobile computing devices of one or more pedestrians, second mobile computing devices of occupants of the one or more other vehicles, a microphone associated with the vehicle, or any combination thereof.

6. The system of claim 4, wherein the one or more processors are further operably configured to:
identify each occurrence of the vehicle ignoring traffic signs or violating traffic laws during the time period based on the observations received from the one or more devices, wherein to generate the indication of the unsatisfactory driving, the one or more processors are operably configured to generate the indication of the unsatisfactory driving based at least in part on a number of identified occurrences during the time period exceeding a threshold number.

7. The system of claim 4, wherein the one or more processors are further operably configured to:
identify one or more dangerous driving attributes in the plurality of dangerous driving attributes exhibited by the vehicle during the time period based on the observations received from the one or more devices, wherein to generate the indication of the unsatisfactory driving, the one or more processors are operably configured to generate the indication of the unsatisfactory driving based on the identified one or more dangerous driving attributes.

8. The system of claim 7, wherein to generate the indication of the unsatisfactory driving, the one or more processors are operably configured to generate the indication of the unsatisfactory driving only if a number of the identified one or more dangerous driving attributes exceeds a threshold number by more than an amount or percentage.

9. The system of claim 7, wherein the one or more dangerous driving attributes includes at least one of braking more than a number of instances, swerving within a lane, changing lanes more than a second number of instances, crossing multiple lane boundaries, flashing headlights at a second vehicle, tailgating the second vehicle, driving the vehicle less than a distance from the second vehicle, or an inattentiveness of a human driver of the vehicle.

10. The system of claim 7, wherein the one or more processors are further operably configured to:
determine whether any of the identified one or more dangerous driving attributes are no longer observed in the driving behavior of the vehicle; and
adjust the one or more driving scores based on the determination of whether any of the identified one or more dangerous driving attributes are no longer observed in the driving behavior of the vehicle.

11. The system of claim 7, wherein the one or more processors are further operably configured to:
generate a report indicating a number of the identified one or more dangerous driving attributes; and
provide the report to the one or more entities.

12. The system of claim 1, wherein the one or more processors are further operably configured to:
receive a first indication of a first speed of the vehicle during a first portion of the time period from one or more first devices;
receive a second indication of a second speed of the vehicle during a second portion of the time period from one or more second devices; and
determine whether the vehicle exceeded a speed limit by more than an amount or exceeded the speed limit for more than a duration of time based on the first indication and the second indication.

13. The system of claim 12, wherein to generate the indication of the unsatisfactory driving, the one or more processors are operably configured to generate the indication of the unsatisfactory driving based at least in part on a determination that the vehicle exceeded the speed limit by more than the amount or exceeded the speed limit for more than the duration of time.

14. The system of claim 1, wherein the one or more processors are further operably configured to:
determine a likelihood of the vehicle being involved in a vehicular accident, a likelihood of the vehicle causing injury to first occupants of the vehicle, a likelihood of the vehicle causing injury to second occupants of one or more other vehicles, or any combination thereof based on the observations; and
provide, to the one or more entities and based on the observations, the determined likelihood of the vehicle being involved in the vehicular accident, the determined likelihood of the vehicle causing injury to the first occupants of the vehicle, the determined likelihood of the vehicle causing the injury to the second occupants of the one or more other vehicles, or any combination thereof.

15. A method of determining one or more driving characteristics of a vehicle, comprising:
receiving, via one or more transceivers, observations of a driving behavior of the vehicle during a time period from one or more devices;
determining driving scores for the vehicle based on the observations of the driving behavior of the vehicle during the time period, wherein each of the driving scores corresponds to a different dangerous driving attribute in a plurality of dangerous driving attributes;
generating an indication of unsatisfactory driving based on a driving score in the driving scores exceeding a threshold value corresponding to one of the plurality of dangerous driving attributes and based on the driving score in the driving scores exceeding the threshold value for more than a portion of the time period, wherein the threshold value is included in threshold values corresponding to the plurality of dangerous driving attributes; and
providing, via the one or more transceivers, the indication of the unsatisfactory driving to one or more entities.

16. The method of claim 15, wherein the vehicle comprises a first autonomous vehicle, a semi-autonomous vehicle, a second autonomous vehicle configured for passenger service, or a first vehicle operated by a human driver and equipped with an advanced driver assistance system (ADAS).

17. The method of claim 15, wherein the one or more entities include at least one of a human driver of the vehicle, a human passenger of the vehicle, an owner of the vehicle, an insurer of the vehicle, a heads-up display of the vehicle, a law enforcement agency, one or more police vehicles, a government motor vehicle agency, or one or more other vehicles.

18. The method of claim 15, wherein the one or more devices include at least one of road-side cameras, road-side sensors, computer vision systems of one or more other vehicles, LIDAR devices, RADAR devices, first mobile computing devices of one or more pedestrians, second mobile computing devices of occupants of the one or more other vehicles, a microphone associated with the vehicle, or any combination thereof.

19. The method of claim 18, wherein the method further comprises:
identifying each occurrence of the vehicle ignoring traffic signs or violating traffic laws during the time period based on the observations received from the one or more devices, wherein generating the indication of the unsatisfactory driving is further based at least in part on a number of identified occurrences during the time period exceeding a threshold number.

20. The method of claim 18, wherein the method further comprises:
identifying one or more dangerous driving attributes in the plurality of dangerous driving attributes exhibited by the vehicle during the time period based on the observations received from the one or more devices,
wherein generating the indication of the unsatisfactory driving is based at least in part on the identified one or more dangerous driving attributes.

21. The method of claim 20, wherein the indication of the unsatisfactory driving is generated only if a number of the identified one or more dangerous driving attributes exceeds a threshold number by more than an amount or percentage.

22. The method of claim 20, wherein the one or more dangerous driving attributes includes at least one of braking more than a number of instances, swerving within a lane, changing lanes more than a second number of instances, crossing multiple lane boundaries, flashing headlights at a second vehicle, tailgating the second vehicle, driving the vehicle less than a distance from the second vehicle, or an inattentiveness of a human driver of the vehicle.

23. The method of claim 20, wherein the method further comprises:
determining whether any of the identified one or more dangerous driving attributes are no longer observed in the driving behavior of the vehicle; and
adjusting the one or more driving scores based on the determination of whether any of the identified dangerous driving attributes are no longer observed in the driving behavior of the vehicle.

24. The method of claim 23, wherein the method further comprises:
generating a report indicating a number of the identified one or more dangerous driving attributes; and
providing the report to the one or more entities.

25. The method of claim 15, wherein the method further comprises:
receiving a first indication of a first speed of the vehicle during a first portion of the time period from one or more first devices;
receiving a second indication of a second speed of the vehicle during a second portion of the time period from one or more second devices; and
determining whether the vehicle exceeded a speed limit by more than an amount or exceeded the speed limit for more than a duration of time based on the first indication and the second indications.

26. The method of claim 15, wherein the method further comprises:
determining a likelihood of the vehicle being involved in a vehicular accident, a likelihood of the vehicle causing injury to first occupants of the vehicle, a likelihood of the vehicle causing injury to second occupants of one or more other vehicles, or any combination thereof based on the received observations; and
providing, to the one or more entities and based on the received observations, the determined likelihood of the vehicle being involved in the vehicular accident, the determined likelihood of the vehicle causing injury to the first occupants of the vehicle, the determined likelihood of the vehicle causing the injury to the second occupants of the one or more other vehicles, or any combination thereof.

27. A system, comprising:
means for receiving, via one or more transceivers, observations of a driving behavior of a vehicle during a time period from one or more devices;
means for determining driving scores for the vehicle based on the observations of the driving behavior of the vehicle during the time period, wherein each of the driving scores corresponds to a different dangerous driving attribute in a plurality of dangerous driving attributes;
means for generating an indication of unsatisfactory driving based on a driving score in the driving scores exceeding a threshold value corresponding to one of the plurality of dangerous driving attributes and based on the driving score in the driving scores exceeding the threshold value for more than a portion of the time period, wherein the threshold value is included in threshold values corresponding to the plurality of dangerous driving attributes; and
means for providing, via the one or more transceivers, the indication of the unsatisfactory driving to one or more entities.

28. A non-transitory computer-readable medium storing computer executable code that, when executed by one or more processors of a system, causes the system to perform operations including:
receiving, via one or more transceivers, observations of a driving behavior of a vehicle during a time period from one or more devices;
determining driving scores for the vehicle based on the observations of the driving behavior of the vehicle during the time period, wherein each of the driving scores corresponds to a different dangerous driving attribute in a plurality of dangerous driving attributes;
generating an indication of unsatisfactory driving based on a driving score in the driving scores exceeding a threshold value corresponding to one of the plurality of dangerous driving attributes and based on the driving score in the driving scores exceeding the threshold value for more than a portion of the time period, wherein the threshold value is included in threshold values corresponding to the plurality of dangerous driving attributes; and
providing, via the one or more transceivers, the indication of the unsatisfactory driving to one or more entities.

* * * * *